United States Patent
Moon et al.

(10) Patent No.: US 6,307,885 B1
(45) Date of Patent: Oct. 23, 2001

(54) DEVICE FOR AND METHOD OF CODING/DECODING IMAGE INFORMATION

(75) Inventors: Joo-Hee Moon; Ji-Heon Kweon, both of Seoul (KR)

(73) Assignee: Hyundai Electronics Ind. Co., Ltd., Kyoungki-do (KR)

( * ) Notice: Subject to any disclaimer, the term of this patent is extended or adjusted under 35 U.S.C. 154(b) by 0 days.

(21) Appl. No.: 08/937,513

(22) Filed: Sep. 25, 1997

(30) Foreign Application Priority Data

Sep. 25, 1996 (KR) .................................. 96-42283

(51) Int. Cl.⁷ .................................................. H04N 7/12
(52) U.S. Cl. ............................ 375/240.08; 375/240.24
(58) Field of Search ............................ 348/420, 421, 348/397–398, 384, 390, 571, 420.1, 422.1; 382/243, 242, 246; 375/240.24, 240.08, 240.1

(56) References Cited

U.S. PATENT DOCUMENTS

| | | | |
|---|---|---|---|
| 5,608,458 | 3/1997 | Chen et al. | 348/394 |
| 5,612,743 * | 3/1997 | Lee | 348/420 |
| 5,701,368 * | 12/1997 | Jung | 382/239 |
| 5,778,100 * | 7/1998 | Chen et al. | 382/243 |
| 5,805,221 * | 9/1998 | Lee | 348/397 |
| 5,822,460 * | 10/1998 | Kim | 382/243 |
| 5,838,830 * | 11/1998 | Qian et al. | 382/243 |
| 5,841,909 * | 11/1998 | Yokoyama | 382/243 |
| 5,883,673 * | 3/1999 | Miyamoto | 348/416 |
| 5,959,672 * | 9/1999 | Sasaki | 348/422 |

* cited by examiner

*Primary Examiner*—Vu Le
(74) *Attorney, Agent, or Firm*—Lawrence G. Kurland, Esq.; Bryan Cave LLP

(57) ABSTRACT

A device for coding image information, which is a shape encoder for splitting an image transferred from an image input into an object image and a background image that have predetermined shape information, includes: a boundary block merge block for merging boundary blocks including both the object and background images out of shape information received, by using a boundary block merge technique; a variable length coding block for variable-length-coding the merged boundary blocks received from the boundary block merge block; and a variable length coding table memory for storing variable length coding tables which are used when the merged boundary blocks are variable-length-coded by the variable length coding block.

18 Claims, 22 Drawing Sheets

FIG.7a
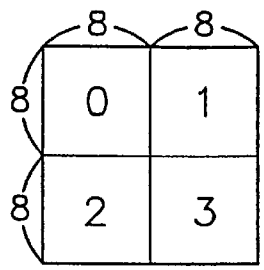  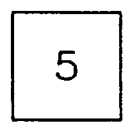
Y　　　　　　　Cb　　　　　　Cr　　　　4:2:0
FIG.7b
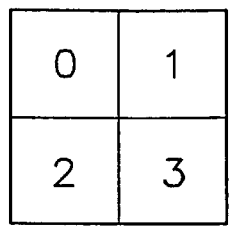  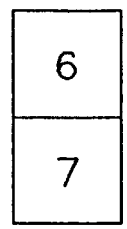
Y　　　　　　　Cb　　　　　　Cr　　　　4:2:2
FIG.7c
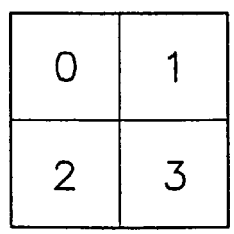 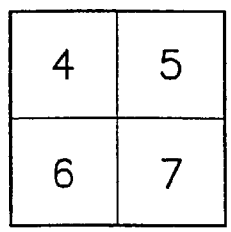 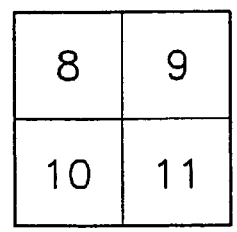
Y　　　　　　　Cb　　　　　　Cr　　　　4:4:4

FIG. 8a
FIG. 8b
FIG. 8c
FIG. 8d
 INTERIOR BLOCK
 BOUNDARY BLOCK

FIG. 22

| Value | CBPY(I) (1234) | CBPY(P) (1234) | CBPY(SPRITE) (1234) | Length | Code |
|---|---|---|---|---|---|
| 0 | 00 00 | 11 11 | 11 11 | 4 | 0011 |
| 1 | 00 01 | 11 10 | 11 10 | 5 | 0010 1 |
| 2 | 00 10 | 11 01 | 11 01 | 5 | 0010 0 |
| 3 | 00 11 | 11 00 | 11 00 | 4 | 1001 |
| 4 | 01 00 | 10 11 | 10 11 | 5 | 0001 1 |
| 5 | 01 01 | 10 10 | 10 10 | 4 | 0111 |
| 6 | 01 10 | 10 01 | 10 01 | 6 | 0000 10 |
| 7 | 01 11 | 10 00 | 10 00 | 4 | 1011 |
| 8 | 10 00 | 01 11 | 01 11 | 5 | 0001 0 |
| 9 | 10 01 | 01 10 | 01 10 | 6 | 0000 11 |
| 10 | 10 10 | 01 01 | 01 01 | 4 | 0101 |
| 11 | 10 11 | 01 00 | 01 00 | 4 | 1010 |
| 12 | 11 00 | 00 11 | 00 11 | 4 | 0100 |
| 13 | 11 01 | 00 10 | 00 10 | 4 | 1000 |
| 14 | 11 10 | 00 01 | 00 01 | 4 | 0110 |
| 15 | 11 11 | 00 00 | 00 00 | 2 | 11 |

FIG. 23

| Index | CBPY (Intra MB) | CBPY (INTER,SPRITE) | Number of bits | Code |
|---|---|---|---|---|
| 0 | 000 | 111 | 3 | 100 |
| 1 | 001 | 110 | 5 | 11111 |
| 2 | 010 | 101 | 5 | 11110 |
| 3 | 011 | 100 | 3 | 101 |
| 4 | 100 | 011 | 5 | 11101 |
| 5 | 101 | 010 | 5 | 11100 |
| 6 | 110 | 001 | 3 | 110 |
| 7 | 111 | 000 | 1 | 0 |

FIG. 24

| Index | CBPY (Intra MB) | CBPY (INTER,SPRITE) | Number of bits | Code |
|---|---|---|---|---|
| 0 | 00 | 11 | 3 | 111 |
| 1 | 01 | 11 | 3 | 110 |
| 2 | 10 | 01 | 2 | 10 |
| 3 | 11 | 00 | 1 | 0 |

FIG. 25

| Index | CBPY (Intra MB) | CBPY (INTER,SPRITE) | Number of bits | Code |
|---|---|---|---|---|
| 0 | 0 | 1 | 1 | 1 |
| 1 | 0 | 0 | 1 | 0 |

DEVICE FOR AND METHOD OF CODING/DECODING IMAGE INFORMATION

BACKGROUND OF THE INVENTION

1. Field of the Invention

The present invention relates to a device for and method of coding/decoding image information by which the image transferred from an image input device is divided into object and background images having predetermined shape information, prior to an encoding/decoding and, more particularly, to a device for and method of coding/decoding image information which is derived to enhance coding/decoding and transmission efficiencies when coding image information by merging a plurality of boundary blocks, by performing a variable length coding according to the characteristic of each block transformed after the merge, and/or decoding the coded information.

2. Discussion of Related Art

As is generally known, image processing techniques, rather than using an entire comprehensive coding, typically divide an image of one frame into designated unit blocks having predetermined shape information, and subsequently the unit blocks are each processed by a compressive coding.

When a still picture is entered, the image is divided into object and background images for a later transmission. As for a moving picture, the variations of the object image are first transferred. By this process, natural or artificial images are composed and decomposed in the units of an object image unrestrictedly, enhancing the compressive coding and transmission efficiencies. An international standard that is based on the unit blocks having shape information has been established by the international organization for standardization (hereinafter, referred to as "ISO"), international telecommunication union telecommunication standardization sector (hereinafter, referred to as "ITU-T") and the like.

For example, ISO/IEC affiliated organizations are carrying out projects for a moving picture compression standardization; MPEG(Moving Picture Expert Group)-4 for moving picture compression standardization in WG11, JPEG(Joint Photographic Coding Experts Group)-2000 for a still picture compression standardization, and H.263+, H.320 and H.331 in ITU-T.

MPWG-4 is based on the concept of shape information and will be described below.

The concept of a VOP (Video Object Plane) is used in the MPEG-4 as a unit block having designated shaped information.

The VOP is defined as a tetragon that includes object and background images divided from an input picture.

The keynote of MPEG-4 lies in the fact that when a picture has a designated object or object region, the object image is divided into VOPs, each of which will be separately encoded, transmitted, or decoded.

The concept of a VOP is used in processing object images in the field of computer graphics and multimedia such as Internet multimedia, interactive video games, interpersonal communications, interactive storage media, multimedia mailing, wireless multimedia, networked database services using an ATM (Asynchronous Transfer Mode) network and the like, remote emergency systems, and remote video surveillance.

FIG. 1 is a block diagram of the VM (Verification Model) encoder 100 first decided by international standardization affiliated organization (ISO/IEC JTC1/SC29/WG11 MPEG96/N1172 JANUARY).

As shown in FIG. 1, a VOP definition block 110 divides a picture sequence, to be transmitted or stored, into a unit object image, and defines different VOPs.

FIG. 2 shows a VOP having a "cat" picture as an object image.

As shown in FIG. 2, the horizontal size of the VOP is defined as "VOP width", and the vertical size is "VOP height". Thus the defined VOP is then divided into (M×N) macro blocks consisting of M and N pixels along the X and Y axes. A grid starting point is framed at the left top of the VOP. For example, the VOP is divided into (16×16) macro blocks having 16 pixels along the X and Y axes respectively.

If the macro blocks formed in the right and bottom part of the VOP do not have M and N picture elements each along the X and Y axes, the VOP should be extended in size to contain M and N pixels respectively along the X and Y axes.

Both M and N are determined as even numerals so that an encoding can be performed in a texture coding sub block, as is described below.

FIGS. 3a–3b illustrates a VOP formed by extracting an object image (having a designated shape) from an input picture, and divided into unit macro blocks.

As shown in FIGS. 3a–3b, the macro blocks forming the VOP comprises regions with object image information and ones having no object image information.

Referring to FIG. 3a, the respective macro blocks are divided into interior macro blocks having object image information exterior macro blocks having no object image information, and boundary macro blocks partly including the image information. Prior to coding or decoding, the macro blocks are divided into the above-mentioned classes.

Referring to FIG. 3b, before a coding or decoding is performed, the boundary macro blocks are divided into, interior sub blocks having object image information, exterior sub blocks having no object image information, and boundary sub blocks partly having object image information.

The respective VOPs defined by the VOP definition block 110 are transferred into VOP coding blocks 120a, 120b, . . . , and 120n to perform a coding by VOPs. They are then multiplexed in a multiplexer 130 and transmitted as bit streams.

FIG. 4 is a block diagram of the VOP coding blocks 120a, 120b, . . . , and 120n of the VM encoder 100 as decided by international standardization affiliated organizations.

Referring to FIG. 4, a motion estimation block 121 receives the VOP concerning the respective object images in order to estimate motion information in the macro blocks from the VOP received.

The motion information estimated by the motion estimation block 121 is transferred into a motion compensation block 122.

An adder 123 receives the VOP, whose motion is compensated by the motion compensation block 122, and the value detected by the adder 123 is transferred into a texture coding block 124 for encoding texture information of the object as sub blocks.

For example, each of the (16×16) macro blocks is divided into (8×8) sub blocks comprising (M/2×N/2) pixels each along the X and Y axes of the macro block.

An adder 125 obtains the sum of the VOP motion-compensated by the motion compensation block 122 and the texture information encoded by the texture coding block 124. The output of the adder 126 is transferred into a previous reconstructed VOP block 126 for detecting the previous VOP, which is the VOP of the previous image.

The previous VOP detected by the previous reconstructed VOP block 126 is used in the motion estimation block 121 and the motion compensation block 122 so as to estimate and compensate the motion.

The VOP defined by the VOP definition block 110 is transferred into a shape coding block 127 for coding the shape information.

As indicated by dotted lines, the output of the shape coding block 127 is selectively transferred into the motion estimation block 121, the motion compensation block 122, or the texture coding block 124 for the use purpose in motion-estimating, motion-compensating, or encoding the texture information of an object. This is determined by the application field of the VOP coding blocks 120a, 120b, . . . , and 120n.

The motion information estimated by the motion compensation block 121, the texture information encoded by the texture coding block 124, and the shape information encoded by the shape coding block 127 are multiplexed by a multiplexer 128, and they are transmitted as a bit stream into the multiplexer 130 as shown in FIG. 1.

As shown in FIG. 5, a demultiplexer 210 of a VM decoder 200 divides the VOP signal encoded by the VM encoder 100 into VOPs. The respective VOP signals divided by the demultiplexer 210 are decoded into the original VOP picture by a plurality of VOP decoding Blocks 220a, 220b, . . . , and 220n, and composed by a composition block 230.

FIG. 6 is a block diagram of the VOP decoding blocks 220a, 220b, . . . , and 220n in the VM encoder 100 as decided by international standardization affiliated organizations.

The VOP encoded signal is transferred from the demultiplexer 210 into a shape decoding block 221, a motion decoding block 222, and a texture decoding block 225, decoding the shape, motion, and texture information of the VOP.

The signal decoded by the motion decoding block 221 is motion-compensated by a motion compensation block 223 and reconstructed into the original VOP by a VOP reconstruction VOP block 224.

The motion compensation block 223 compensates the motion of the current VOP by using the reconstructed image of the previous VOP transferred from a VOP memory 226. The reconstructed VOP block 224 reconstructs the VOP by using texture information of an object transferred from the motion compensation block 223 and the texture decoding block 225.

As indicated by dotted lines, the output of the shape decoding block 221 is selectively transferred into the motion compensation block 223 or the reconstructed VOP block 224 for either in compensating the motion or reconstructing the VOP. This is determined by the application of the VOP decoding blocks 220a, 220b, . . . , and 220n.

A definition block 230 receives the reconstructed VOP from the reconstructed VOP block 224 and composes the reconstructed VOP received from the VOP decoding blocks 220a, 220b, . . . , and 220n, further reconstructs the original VOP.

After an input picture is divided into designated unit blocks having predetermined shape information, each of the unit blocks are coded or decoded, which enhances compressive encoding and transmission efficiencies. The fundamental principle of this system is the same as employed in other image processing systems.

A basic block, or a unit block, having predetermined shape information comprises luminance blocks representing luminance signals, and chrominance blocks representing chrominance signals. The chrominance signals further correspond to the luminance signals.

FIG. 7 presents a general overview of a macro block structure that is a basic block forming a VOP. FIGS. 7a–7c show the macro block structures of 4:2:0, 4:2:2, and 4:4:4 formats, respectively.

To code (or decode) the macro block, bits for coded block patterns are allotted to the luminance and chrominance blocks. In 4:2:0 format, the luminance block has four sub blocks and the chrominance block has two sub blocks.

However, this coding method presents a disadvantage. Specifically, the coding efficiency is low because when boundary macro blocks are coded/decoded, VLC (Variable Length Coding) is performed irrespective of the sub block is a boundary, interior, or exterior sub block. Hereafter, a boundary sub block and an interior sub block will be referred to as "object block" in this document.

As shown in FIGS. 8a–8d, a luminance block, comprising four sub blocks is coded/decoded by using a VLC coding/decoding table. The table, however, is made in consideration of all four sub blocks. This is despite the fact that the frequency of occurrence to express the arrangement of a sub block is varied according to the arrangement characteristics of each object block and exterior sub block.

For example, as shown in FIGS. 8a–8d, four object blocks can have only one arrangement; three object blocks may have four arrangements, two object blocks may have six arrangements, and one object block may have four arrangements.

Korean Patent Application No. 95-37918 and ISO/IEC JTC1/SC29/WG11 N1469 "video VM version 5.0" disclose a method of enhancing coding/decoding efficiency by using different VLC tables according to the number of object blocks that form a luminance block. In a BBM (Boundary Block Merge) technique, disclosed in Korean Patent Application No. 96-27766, No. 96-27767, No. 96-38405, No. 97-04738, and No. 97-04739, a plurality of boundary macro blocks, or a plurality of sub blocks constituting the boundary macro blocks are merged and coded/decoded.

FIG. 9 illustrates the BBM technique for sub blocks constituting a boundary macro block.

In the BBM technique, it is suggested that to enhance the coding/decoding efficiency of unit blocks (i.e., macro blocks) wherein the unit blocks have predetermined shape information the number of object blocks may be varied. This may be performed in conjunction with other techniques using different VLC tables according to the number of object blocks. However, some problems arise in that the two techniques are so separately performed in spite of their close technical correlation that high coding/decoding and transmission efficiencies cannot be attained.

SUMMARY OF THE INVENTION

Accordingly, the present invention is directed to a device for and method of coding/decoding image information that substantially obviates one or more of the problems due to limitations and disadvantages of the related art.

An object of the present invention is to provide a device for and method of coding image information which is derived to enhance an efficiency in coding a boundary block between object and background images, or sub blocks constituting the boundary block by performing a VLC for the boundary block or sub blocks constituting the boundary block that are merged by using a BBM technique.

Another object of the present invention is to provide a device for and method of decoding image information by which the picture signal is decoded in the same manner of the above coding method.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a device for coding image information in the first construction, which is a image encoder for splitting an image transferred from an image input into an object image and a background image that have predetermined shape information, comprises: a boundary block merge section for merging boundary blocks including both the object and background images out of shape information received, by using a boundary block merge technique; a variable length coding section for variable-length-coding the merged boundary blocks received from the boundary block merge section; and a variable length coding table memory for storing variable length coding tables which are used when the merged boundary blocks are variable-length-coded by the variable length coding section.

A device for coding image information in the second construction, which is a image encoder for splitting an image transferred from an image input into an object image and a background image that have predetermined shape information, includes: a boundary block merge section for merging boundary blocks including both the object and background images out of shape information received, by using a boundary block merge technique; a discrete cosine transformer for discrete-cosine-transforming the image signal concerning the boundary blocks merged by the boundary block merge section; a quantization section for quantizing the transformed coefficient transferred from the discrete cosine transformer; a variable length coding section for variable-length-coding the quantized image signal transferred from the quantization section; and a variable length coding table memory for storing variable length coding tables used when the merged boundary blocks are variable-length-coded by the variable length coding section.

A device for coding image information in the third construction, which is a image encoder for splitting an image transferred from an image input into an object image and a background image that have predetermined shape information, includes: a boundary block merge section for merging boundary blocks including both the object and background images out of shape information received, by using a boundary block merge technique, and generating an image signal concerning the merged boundary blocks and merge information; a discrete cosine transformer for discrete-cosine-transforming the image signal concerning the boundary blocks merged by the boundary block merge section; a quantization section for quantizing the transformed coefficient transferred from the discrete cosine transformer; and a transformed coefficient and coded block pattern coding section for variable-length-coding the quantized coefficient, and coding a texture information by using the merge information transferred from the boundary block merge section.

A device for coding image information in the forth construction, which is a image encoder for splitting an image transferred from an image input into an object image and a background image that have predetermined shape information, includes: a boundary block padding section receiving the image signal, or an image error signal and the original shape information, and determining the region having no object image as a value or zero by using the mean value of the region having the object image and low-frequency filtering, in sub blocks constituting boundary blocks including the object and background images; a boundary block merge section for merging the boundary blocks out of the shape information transferred from the boundary block padding section by using a boundary block merge technique, and generating the image signal concerning the merged boundary blocks, and merge information; a discrete cosine transformer for discrete-cosine-transforming the image signal concerning the boundary blocks merged by the boundary block merge section; a quantization section for quantizing the transformed coefficient transferred from the discrete cosine transformer;

a transformed coefficient and coded block pattern coding section for variable-length-coding the quantized coefficient transferred from the quantization section, and coding texture information by using the merge information transferred from the boundary block merge block; an inverse quantization section for inverse-quantizing the transformed coefficient quantized by the quantization block, and extracting the transformed coefficient; an inverse discrete cosine transformer for inverse-discrete-cosine-transforming the transformed coefficient transferred from the inverse quantization section; and a boundary block split section for receiving the reconstructed image single and shape information from the inverse discrete cosine transformer, generating decoded information.

A device for coding image information in the fifth construction, which is a image encoder for splitting an image transferred from an image input into an object image and a background image that have predetermined shape information, includes: an unit block definition section receiving an image signal and defining unit blocks having predetermined shape information; a motion estimation section for estimating the motion of the image transferred from the unit block definition section in the units of a macro block; a motion compensation section for motion-compensating the motion information transferred from the motion estimation section; a subtractor for obtaining the difference value between the motion-compensated unit blocks transferred from the motion compensation section and the unit blocks defined by the unit block definition section; a texture coding section for coding the difference value and shape information transferred from the subtractor until boundary blocks are received, merging the boundary blocks by a boundary block merge technique, and variable-length-coding the merged boundary blocks according to the characteristics of the merged boundary blocks; an adder for obtaining the sum value between the motion-compensated unit blocks transferred from the motion compensation section and the interior information coded by the texture coding section; a previous reconstructed unit section detector for detecting the unit blocks of the previous image from the output of the adder, and transmitting them to the motion estimation section and the motion compensation section; a shape coding section for coding the shape information concerning the image transferred from the unit block definition section in the units of a macro block; a multiplexer for multiplexing the motion information estimated by the motion estimation section, the interior information coded by the texture coding section, and the shape information coded by the shaped coding section; and a buffer for transmitting the output of the multiplexer as bit streams.

In addition, the texture coding section in the fifth construction, comprises: a boundary block padding section receiving the image signal, or an image error signal and the original shape information, and determining the region having no object image as a value or zero by using the mean value of the region having the object image and low-frequency filtering, in sub blocks constituting boundary blocks including the object and background images; a boundary block merge section for merging the boundary blocks out of the shape information transferred from the boundary block padding section by using a boundary block merge technique, and generating the image signal concerning the merged boundary blocks, and merge information; a discrete cosine transformer for discrete-cosine-transforming the image signal concerning the boundary blocks merged by the boundary block merge section; a quantization section for quantizing the transformed coefficient transferred from the discrete cosine transformer; a transformed coefficient and coded block pattern coding section for variable-length-coding the quantized coefficient transferred from the quantization section, and coding texture information by using the merge information transferred from the boundary block merge section; an inverse quantization section for inverse-quantizing the transformed coefficient quantized by the quantization section, and extracting the transformed coefficient; an inverse discrete cosine transformer for inverse-discrete-cosine-transforming the transformed coefficient transferred from the inverse quantization section; and a boundary block split section for receiving the reconstructed image single and shape information from the inverse discrete cosine transformer, generating decoded information.

As above described in the first to fifth constructions, the unit block is VOP and a boundary block merge section merges a plurality of boundary blocks constituting the unit block, or luminance and chrominance blocks of the sub blocks constituting the boundary blocks.

A transformed coefficient and coded block pattern coding block performs a coding by using variable length coding tables that are different according to the number of object blocks, including the object image, out of a plurality of sub blocks constituting a boundary block, or the arrangement characteristic of the object blocks. The variable length coding tables are constructed with bits increasingly allotted from the arrangement characteristic having the most frequency of occurrence to that having the least frequency of occurrence.

In "a method of coding image information" according to the present invention, when an input image transferred from an image input is divided into object and background images having predetermined shape information, the boundary blocks including both the object and background images are merged by a boundary block merge, and the image is processed by a variable length coding according to the result.

In the process of merging the boundary blocks, a plurality of boundary blocks, or luminance and chrominance blocks of the sub blocks constituting the boundary blocks are respectively merged. In the variable length coding, different variable length coding tables are used depending on the number of object blocks, or arrangement characteristics.

The variable length coding tables are constructed with bits increasingly allotted from the arrangement characteristic having the most frequency of occurrence to that having the least frequency of occurrence.

"A device for decoding image information" according to the present invention is to decode an image signal coded by "the device for coding image information", the device according to the first construction, comprises: a variable length decoding section for variable-length-decoding the image signal coded by a variable length coding after a boundary block merge technique; a variable length decoding table memory for storing decoding tables used when the coded image signal is decoded by the variable length decoding section; and a boundary block split section for receiving the decoded image signal from the variable length decoding section, and splitting the boundary blocks or sub blocks constituting the boundary blocks, merged by the boundary block merge technique, into the boundary blocks or their sub blocks before the merge.

The device for decoding image information according to the second construction, comprises: a variable length decoding section for variable-length-decoding the image signal coded by a variable length coding after a boundary block merge technique; a variable length decoding table memory for storing decoding tables used when the coded image signal is decoded by the variable length decoding section; an inverse quantization section for inverse-quantizing the decoded image signal transferred from the variable length decoding section; an inverse discrete cosine transformer for inverse-discrete-cosine-transforming the inverse-quantized image signal transferred from the inverse quantization section; and a boundary block split section for receiving the transformed image signal from the inverse discrete cosine transformer, and splitting the boundary blocks or sub blocks constituting the boundary blocks, merged by the boundary block merge technique, into the boundary blocks or their sub blocks before the merge.

The device for decoding image information according to the third construction, comprises: a merge information extraction section for receiving the shape information of the object image coded by a boundary block merge technique, and extracting merge information; a transformed coefficient and coded block pattern decoding section for receiving the merge information transferred from the merge information extraction section and the coded image signal from an encoder, and variable-length-decoding transformed coefficients and coded pattern blocks; an inverse quantization section for inverse-quantizing the decoded image signal transferred from the transformed coefficient and coded pattern block decoding section; an inverse discrete cosine transformer for inverse-discrete-cosine-transforming the inverse-quantized image signal transferred from the inverse quantization section; and a boundary block split section for receiving the transformed image signal from the inverse discrete cosine transformer and the merge information from the merge information extraction section, and splitting boundary blocks or sub blocks constituting the boundary blocks, merged by the boundary block merge technique, into the boundary blocks or their sub blocks before the merge.

The device for decoding image information according to the forth construction, comprises: a demultiplexer for demultiplexing a coded image signal including a multiplexed image signal variable-length-coded after a boundary block merge; a shape decoder for receiving the image signal from the demultiplexer, and decoding shape information; a motion decoding section for receiving the demultiplexed image signal from the demultiplexer, and decoding motion information; a texture decoding section for receiving the demultiplexed image signal from the demultiplexer, and decoding interior coded information; an unit block memory for storing reconstructed unit blocks; a motion compensation section for receiving the motion information from the motion decoding section, the shape information from the shape decoding section, and information concerning the previous unit block reconstructed by the unit block memory; a unit block reconstruction section for receiving the motion-compensated information from the motion compensation section, the shape information from the shape decoding section, and the interior information from the texture decoding section, and reconstructing the image in the units of an unit block; and a composition section for composing the image concerning the unit blocks reconstructed by the unit block reconstruction block.

Here, the texture decoding section in the device for decoding image information according to the forth construction, comprises: a merge information extraction section for receiving the shape information of the object image coded by a boundary block merge technique, and extracting merge information; a transformed coefficient and coded block pattern decoding section for receiving the merge information transferred from the merge information extraction section and the coded image signal from an encoder, and variable-length-decoding transformed coefficients and coded pattern blocks; an inverse quantization section for inverse-quantizing the decoded image signal transferred from the transformed coefficient and coded pattern block decoding section; an inverse discrete cosine transformer for inverse-discrete-cosine-transforming the inverse-quantized image signal transferred from the inverse quantization section; and a boundary block split section for receiving the transformed image signal from the inverse discrete cosine transformer and the merge information from the merge information extraction section, and splitting boundary blocks or sub blocks constituting the boundary blocks, merged by the boundary block merge technique, into the boundary blocks or their sub blocks before the merge.

In the first to forth constructions of the device for decoding image information, it uses a VOP as a unit block. When decoding a coded signal, a transformed coefficient and coded block pattern coding section uses variable length coding tables that are the reverse of the variable length coding tables used in a coding process. A smallest coded bits are used to express the arrangement characteristic of an object block having the highest frequency of occurrence. With more bits, the arrangement characteristic of the object block is decreased in the frequency of occurrence.

In "a method of decoding image information"0 according to the present invention, the image signal coded by a variable length coding technique after a boundary block merge is variable-length-decoded, and then boundary blocks or the sub blocks constituting the boundary blocks merged by the boundary block merge technique are divided into the boundary blocks or sub blocks before the merge.

In the variable length decoding, different variable length decoding tables are used depending on the number of object blocks, or arrangement characteristics. A smallest coded bits are used to express the arrangement characteristic of an object block having the highest frequency of occurrence. With more bits, the arrangement characteristic of the object block is decreased in the frequency of occurrence.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention are incorporated in and constitute a part of this specification. They further illustrate embodiments of the invention and, together with the description, serve to explain the principles of the invention:

In the drawings:

FIG. 7a is a view of a macro block structure in 4:2:0 format;

FIG. 7b is a view of a macro block structure in 4:2:2 format;

FIG. 7c is a view of a macro block structure in 4:4:4 format;

FIG. 8a is a view of an arrangement characteristic when four object blocks exist;

FIG. 8b is a view of an arrangement characteristic when three object blocks exist;

FIG. 8c is a view of an arrangement characteristic when two object blocks exist;

FIG. 8d is a view of an arrangement characteristic when one object block exists;

FIG. 22 illustrates the variable length coding table applied to the present invention when four object blocks exist;

FIG. 23 illustrates the variable length coding table applied to the present invention when three object blocks exist;

FIG. 24 illustrates the variable length coding table applied to the present invention when two object blocks exist; and FIG. 25 illustrates the variable length coding table applied to the present invention when one object block exists.

DETAILED DESCRIPTION OF PREFERRED EMBODIMENT

Reference will now be made in detail to the preferred embodiments of the present invention, examples of which are illustrated in the accompanying drawings.

<First Embodiment>

The following details a first embodiment of the coder of the present invention.

Figure 10:
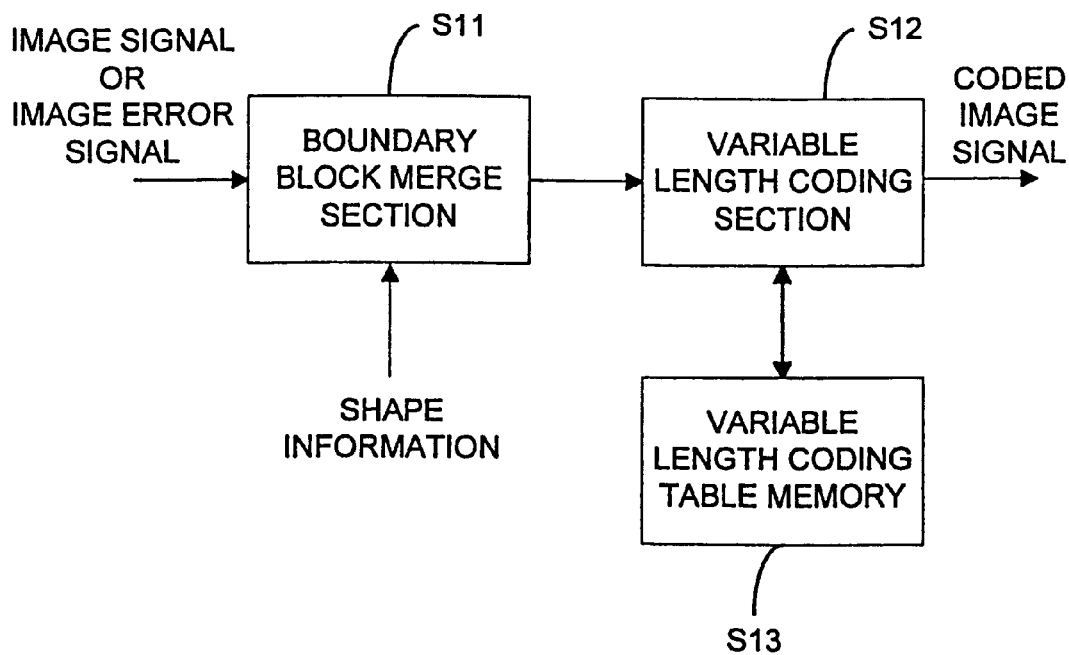
FIG. 10 is a block diagram of a first embodiment of the code of the present invention.

As shown in FIG. 10, the coder of the present invention comprises a boundary block merge section S11, a variable length coding section S12, and a variable length coding table memory S13.

A moving picture or still picture received through a picture input is divided into object background images having predetermined shape information, and transferred into the boundary block merge section S11. The boundary block merge section S11 codes the image signal sequentially by unit blocks until boundary blocks are received. When boundary blocks are received, the boundary blocks are merged by a BBM technique.

The block merged by the BBM technique will comprise either at least two boundary blocks, or the luminance or chrominance blocks of the sub blocks constituting the boundary block.

Figure 1:
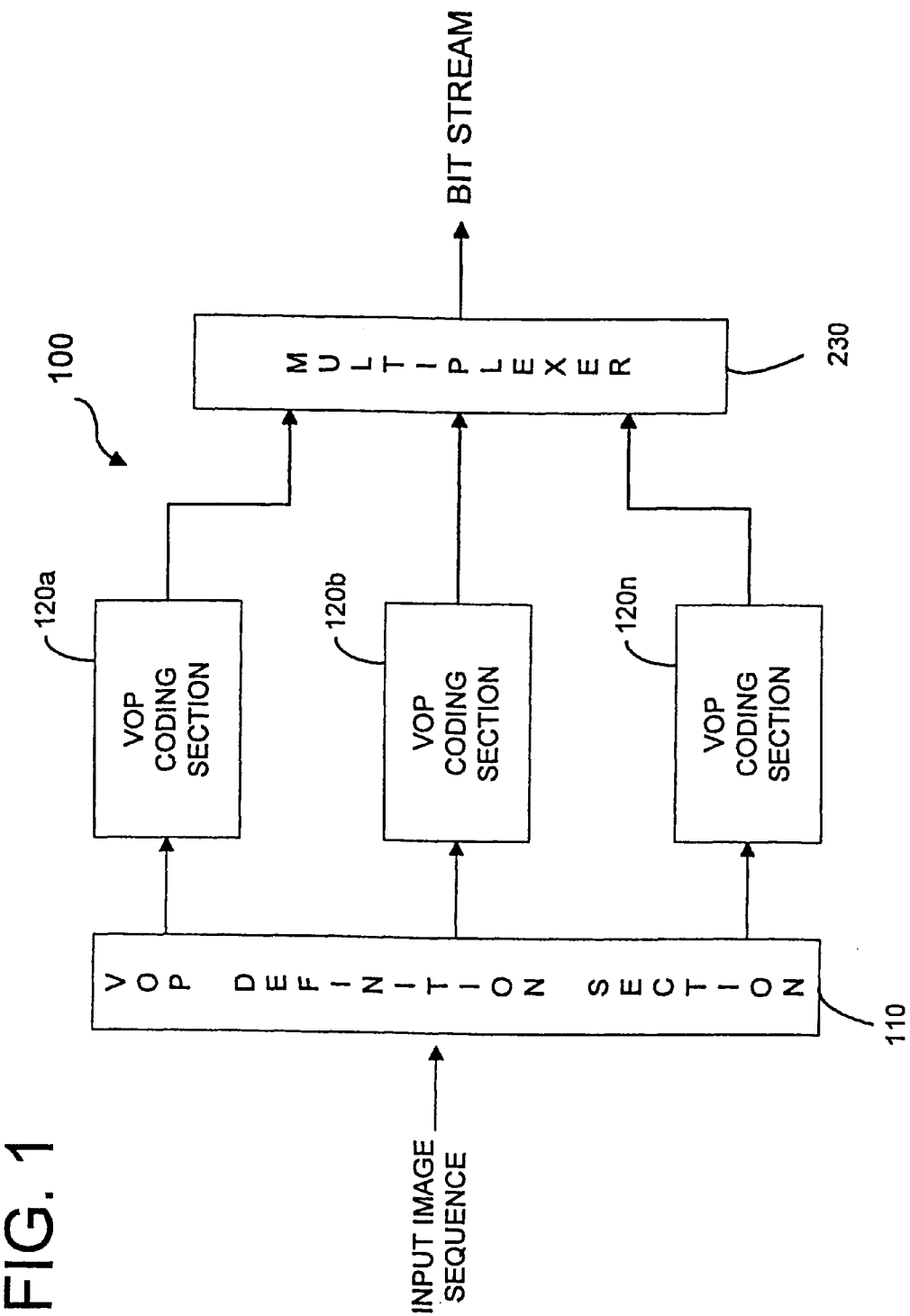
FIG. 1 is a block diagram of a VM encoder known in the prior art.
Figure 2:
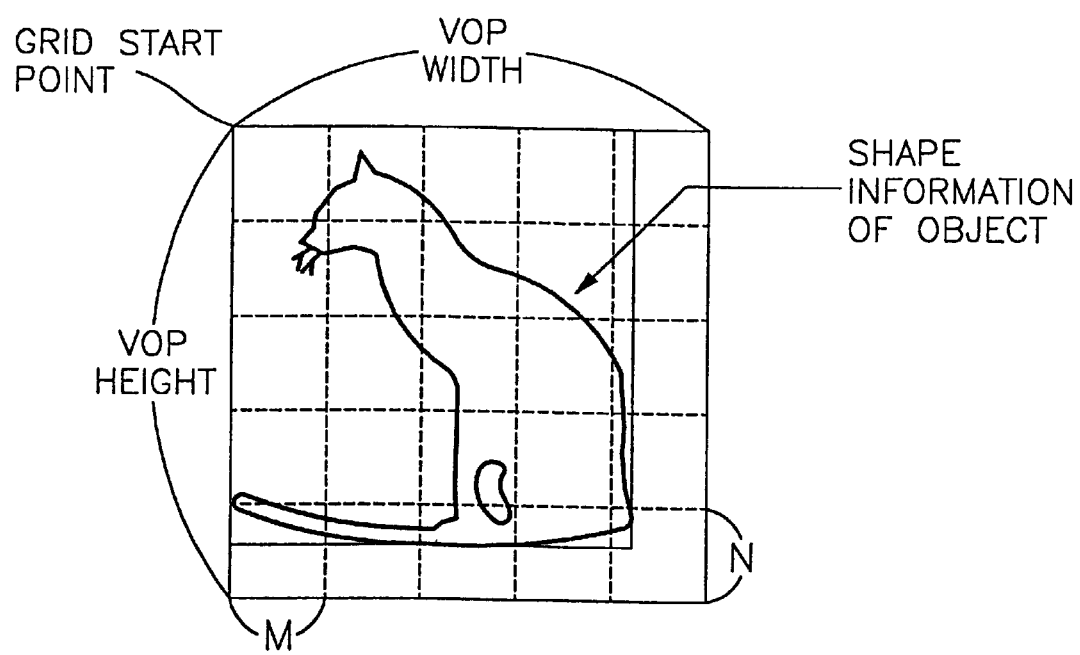
FIG. 2 shows a VOP having shape information divided into macro blocks.
Figure 3A:
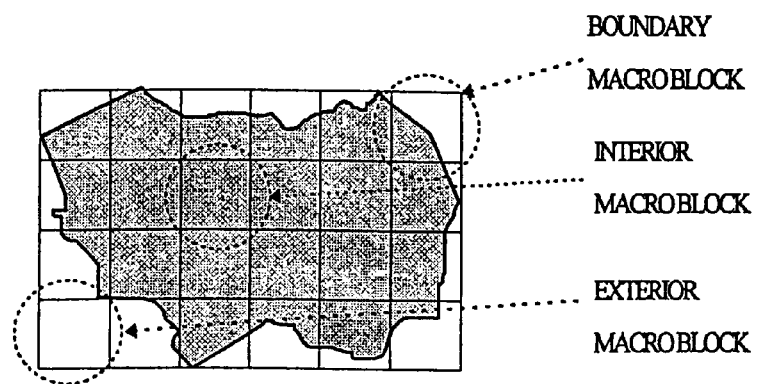
FIG. 3A illustrates the type of macro blocks constituting a VOP.
Figure 3B:
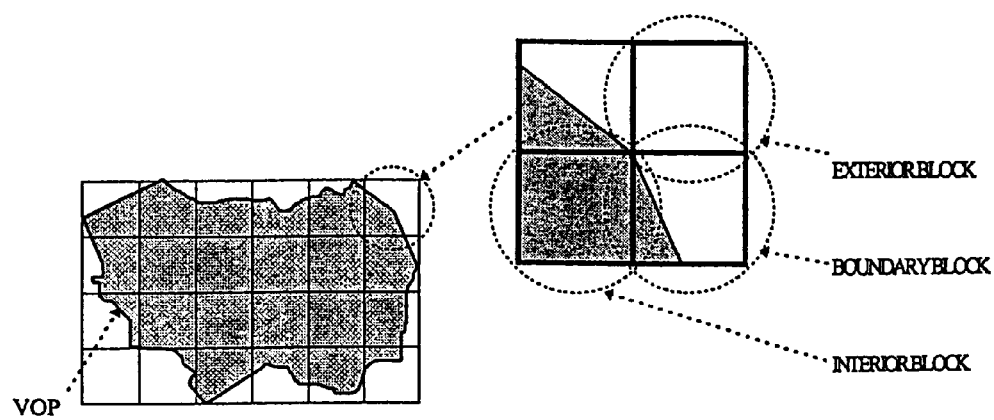
FIG. 3B illustrates the type of sub blocks constituting a macro block.
Figure 4:
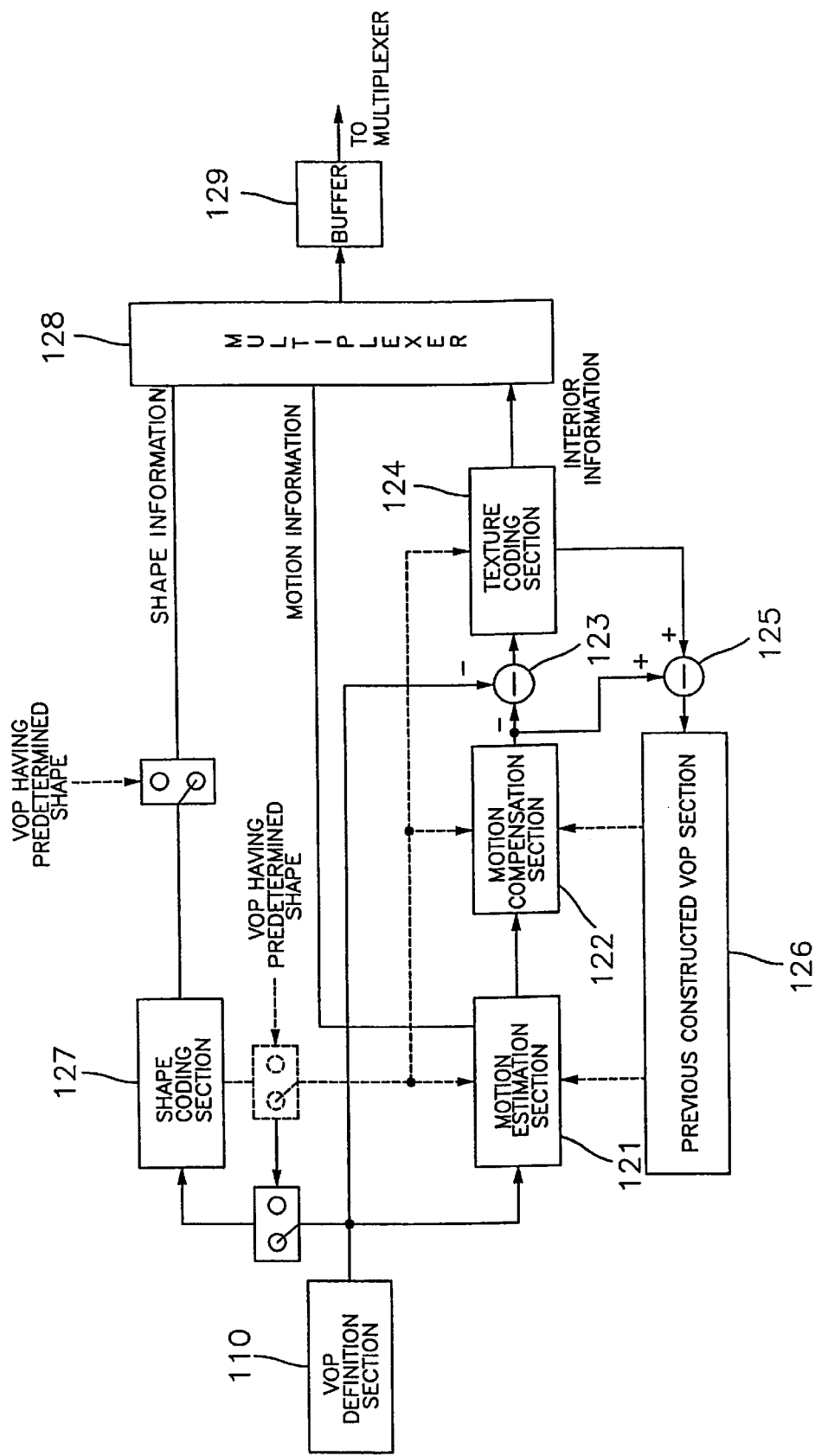
FIG. 4 is a block diagram of a VOP coding section known in the prior art.
Figure 5:
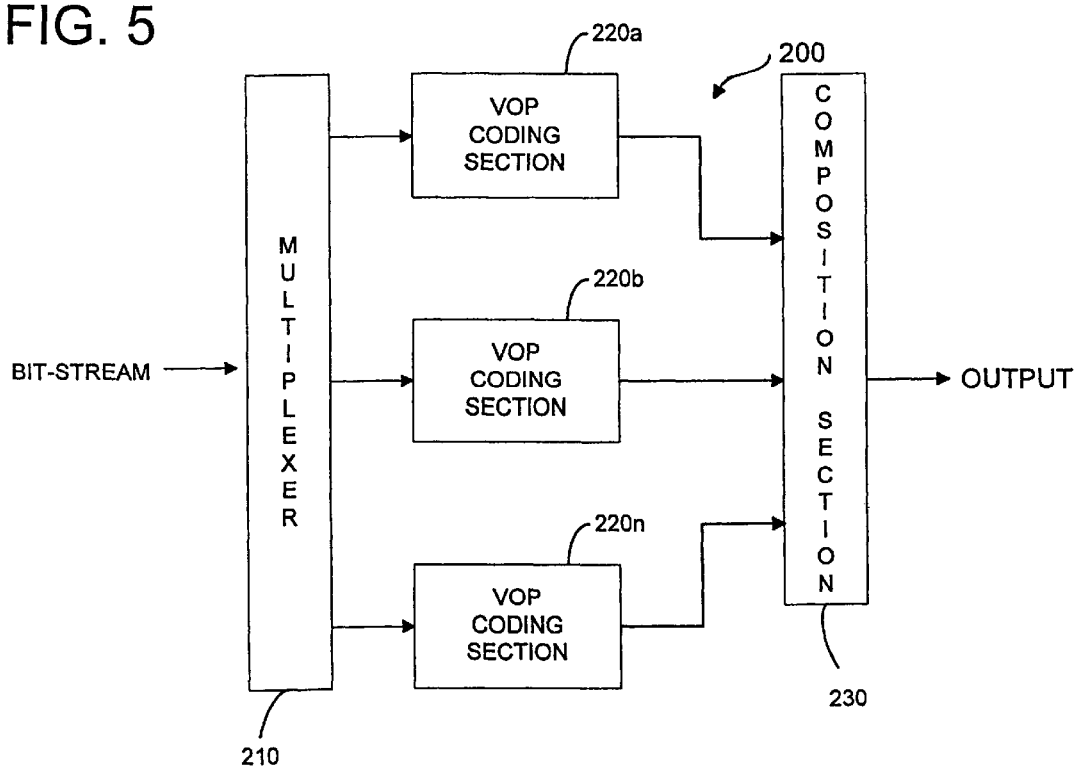
FIG. 5 is a block diagram of a VM decoder known in the prior art.
Figure 6:
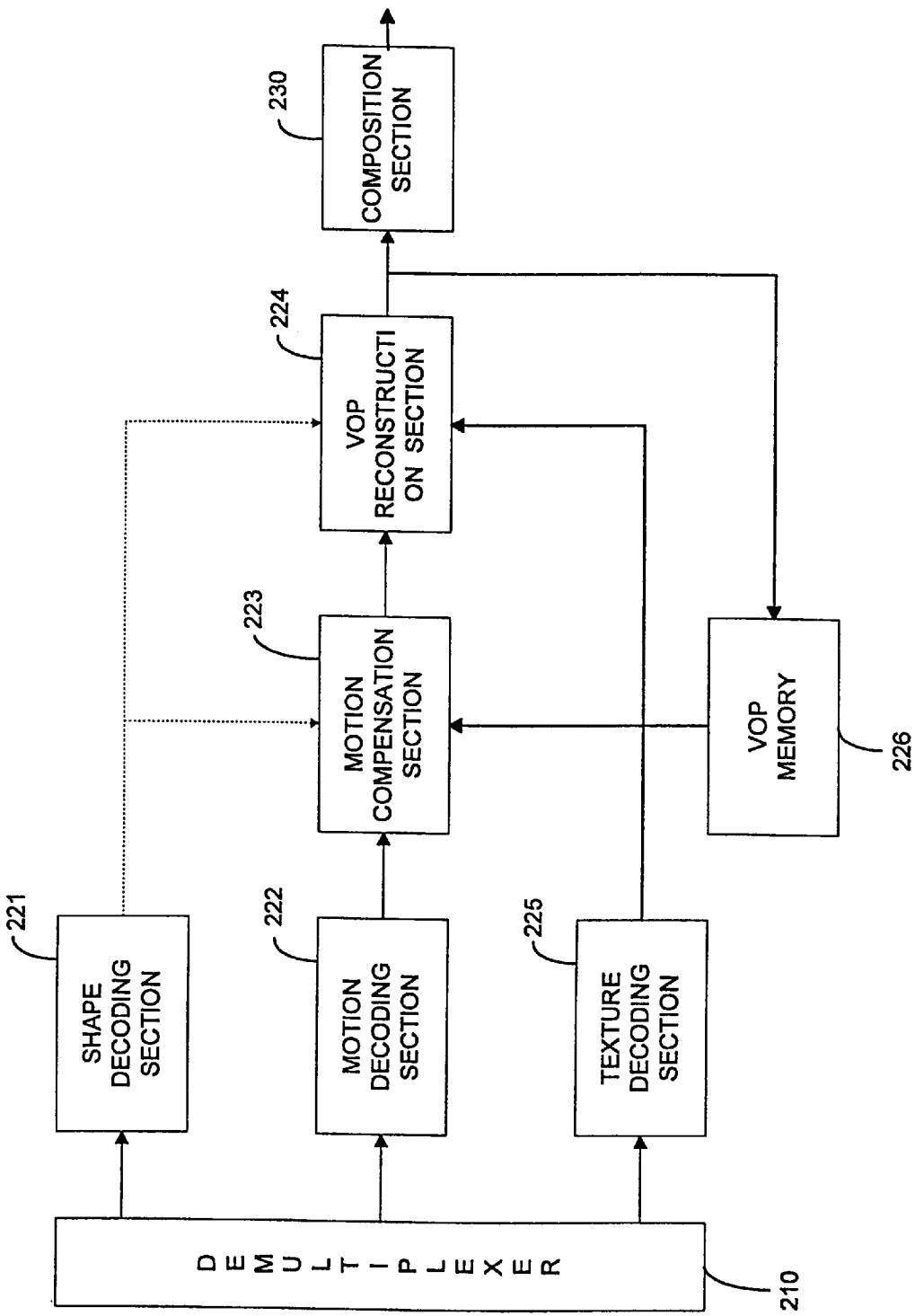
FIG. 6 is a block diagram of a VOP decoding section known in the prior art.
Figure 9:
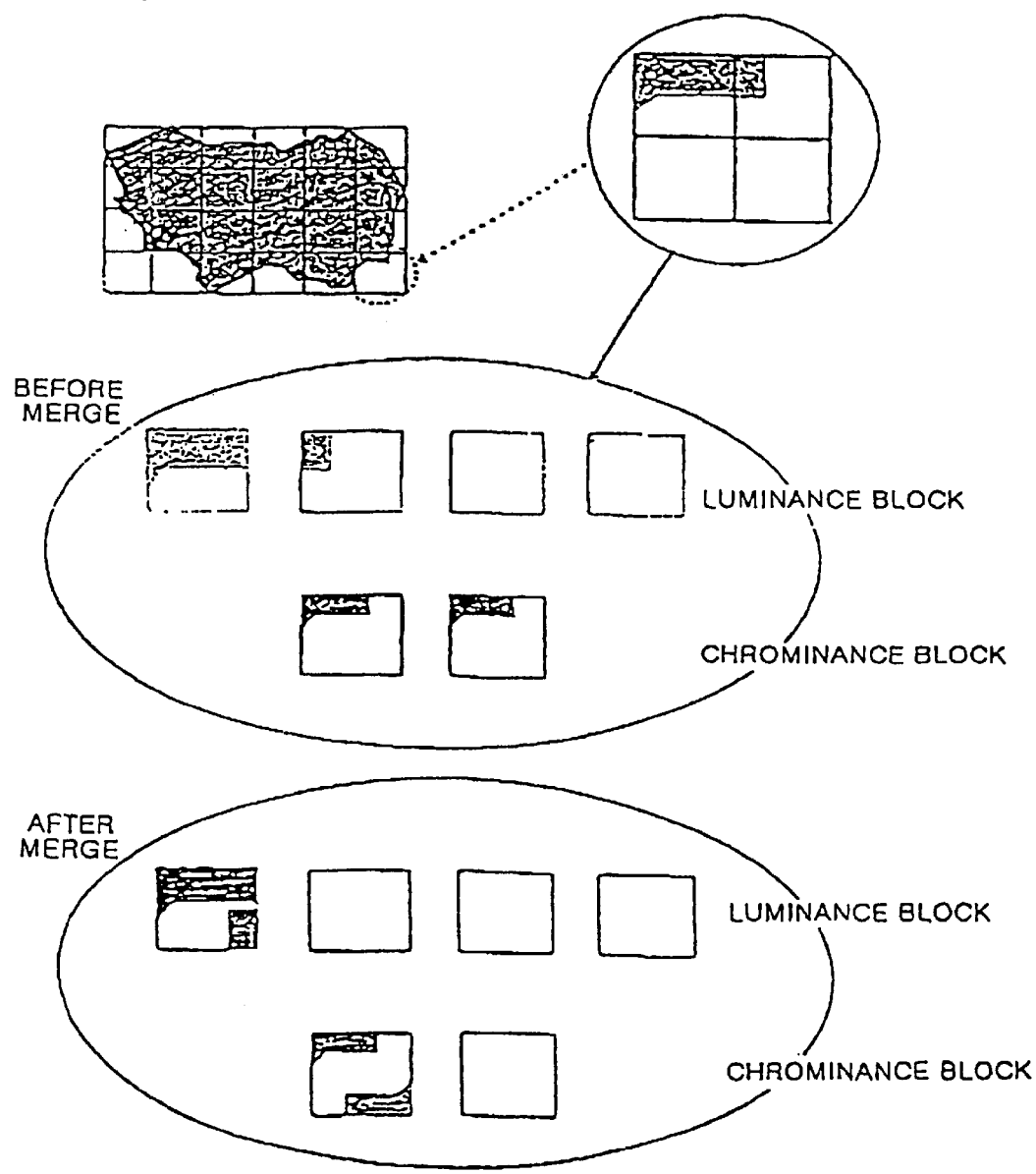
FIG. 9 illustrates before and after a boundary block merging.

FIG. 9 illustrates sub blocks both before and after the BBM is applied to separate groups of luminance and chrominance blocks. In this case, the boundary block of (N×N) is divided into sub blocks of (N/2×N/2). As illustrated in FIG. 9, the number of object blocks is reduced after the BBM.

The image signal, having boundary blocks merged by the boundary block merge section S11, is transferred into the variable length coding section S12 of FIG. 10.

The variable length coding section S12 performs a VLC for the merged image signal by using a variable length coding table stored in the variable length coding table memory S13. The number of coded bits can be decreased because the object blocks are first reduced in number by the BBM technique and the processed by the VLC.

The variable length coding table used in the VLC is variable in construction. This is due to the fact that used bits are differently defined according to the number of object blocks. Moreover, the VLC table has variables such as arrangement characteristic of each object block, and frequency of occurrence for the arrangement characteristic. The variable length coding table is constructed with a plurality of bits that are increasingly allotted to the arrangement characteristics while decreasing in the frequency of occurrence.

<Second Embodiment>

According to a second embodiment of the present invention, a code to code an image by compressing boundary blocks merged by a BBM technique is provided.

The block data is compressed by a conversion technique such as DCT (Discrete Cosine Transform), WHT (Walshhadamard Transform), DFT (Discreate Fourier Transform), or DST (Discreate Sine Transform). Thus, transformed coefficients are properly coded according to the characteristics of coefficient data.

In the present embodiment, the DCT technique is used.

Figure 11:
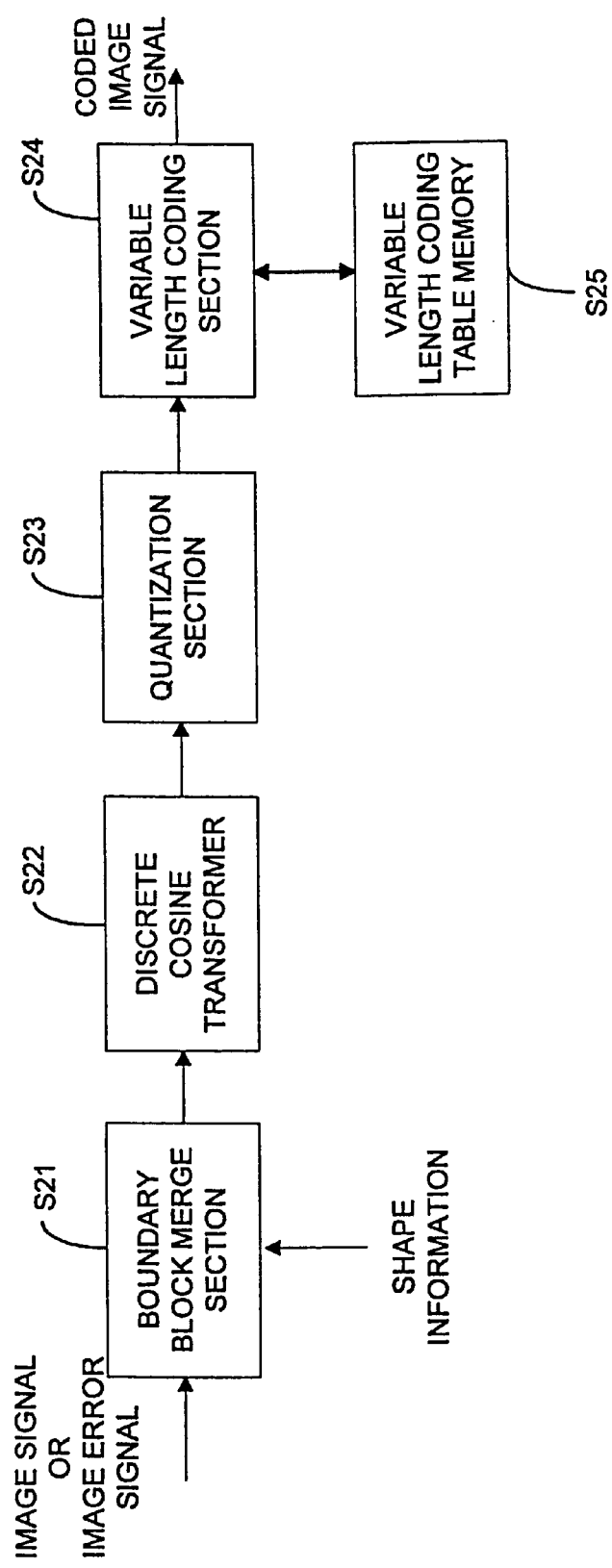
FIG. 11 is a block diagram of a second embodiment of the code of the present invention.

As shown in FIG. 11, the device comprises: a boundary block merge section S21 the output of which is connected to the input of a discrete cosine transformer S22; a quantization section the input of which is connected to the output of the discrete cosine transformer S22; and a variable length coding section S24 connected to the output of the quantization section S23, the output of a variable length coding table memory S25 bits sectionally connected to the input of the variable length coding section S24.

A moving picture or still picture received through a picture input is divided into object and background images having predetermined shape information, and transferred into the boundary block merge section S21. The boundary block merge section S21 codes the image signal sequentially by unit blocks until the boundary blocks are received. The unit blocks comprise the shape information while the boundary blocks comprise both object and background images. When boundary blocks are received, the boundary block merging section S21 merges the boundary blocks by a BBM technique.

The block merged in the boundary block merge section S21 by the BBM technique is the same as obtained in the first embodiment.

The merged boundary blocks are now converted by the discrete cosine transformer S22 and quantized by the quantization section S23.

The variable length coding section S24 performs a VLC for the quantized image signal by using a variable length coding table stored in the variable length coding table memory S25.

Because the object blocks are first reduced in number by the BBM technique before they are processed by DCT, quantization, and VLC, the number of coded bits can be decreased, thus enhancing the efficiency of a compressive coding.

The variable length coding table used in the VLC is variable in construction. This is due to the fact that used bits are differently defined according to the number of object blocks. Moreover, the VLC table has variables such as arrangement characteristic of each object block, and frequency of occurrence for the arrangement characteristic. The variable length coding table is constructed with a plurality of bits that are increasingly allotted to the arrangement characteristics while decreasing in the frequency of occurrence.

FIGS. 23–25 illustrates the variable length coding tables used in a luminance block coding when there are four, three, two, or one object blocks, respectively.

"CBPY(I)" indicates the coding table used when the luminance block is an intra block, "CBPY(P)" indicates the coding table used for an inter block, and "CBPY(SPRITE)" indicates the coding table for a sprite block.

The bit stream "CBPY(I)", "CBPY(P)", and "CBPY (SPRITE)", "1" represents that other than a DC component, for example, an AC component exists. A "0" in the bit stream represents that information other than a DC component does not exist. From the left side of the bit stream, there are first, second, third and fourth object blocks.

<Third Embodiment>

According to a third embodiment of the present invention, a code to code an image together with transformed coefficients and merge information after boundary blocks are merged by a BBM technique is provided.

In other words, the merge information obtained from the BBM of the boundary blocks, and the transformed coefficient from the DCT are both coded to produce a texture.

Figure 12:
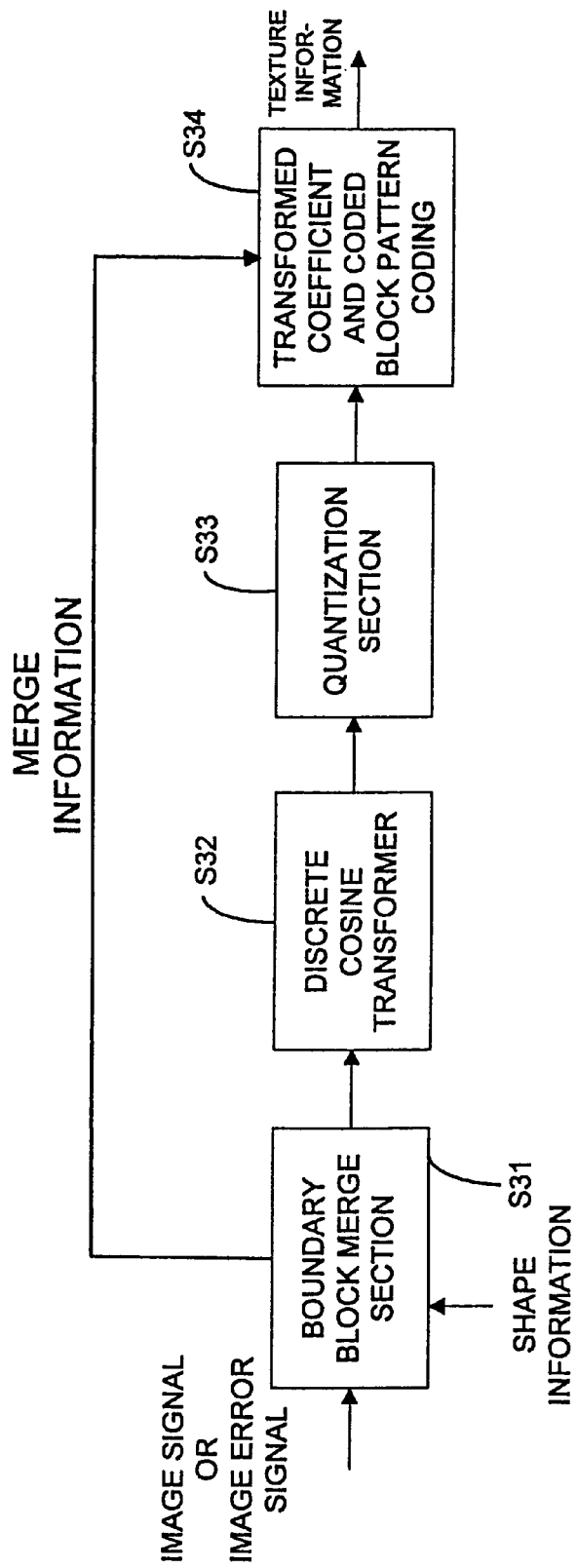
FIG. 12 is a block diagram of a third embodiment of the code of the present invention.

As shown in FIG. 12, the device comprises: a boundary block merge section. S31 the output of which is connected to the input of a discrete cosine transformer S32; a quantization section S33 the output of which is connected to the input of the discrete cosine transformer S32; and a transformed coefficient and coded block pattern coding section S34 connected to the output of the quantization section S33.

A moving picture or still picture received through a picture input is divided into object and background images having predetermined shape information, and transferred into the boundary block merge section S31. The boundary block merge section S31 codes the image signal sequentially by unit blocks until the boundary blocks are received. The unit blocks comprise the shape information while the boundary blocks comprise both object and background images. When boundary blocks are received, the boundary block merge section S31 merges the boundary blocks by a BBM technique.

The blocks merged in the boundary block merge section S31 by the BBM technique are the same as obtained in the first embodiment.

The merged boundary blocks are now converted by the discrete cosine transformer S32 and quantized by the quantization section S33.

The transformed coefficient and coded block pattern coding section S34 performs a VLC for the quantized, transformed coefficient by using a variable length coding table. It further codes the merge information transferred from the boundary block merge section S31, generating texture information.

The variable length coding table used in the VLC has the same construction as described in the second embodiment.
<Fourth Embodiment>

According to a fourth embodiment of the present invention, codes to detect coding errors is provided. This is accomplished by reconstructing the quantized image into the original by a DCT, after a boundary block merging, in compressing boundary blocks merged by a BBM technique and coding them together with merge information and transformed coefficients.

Figure 13:
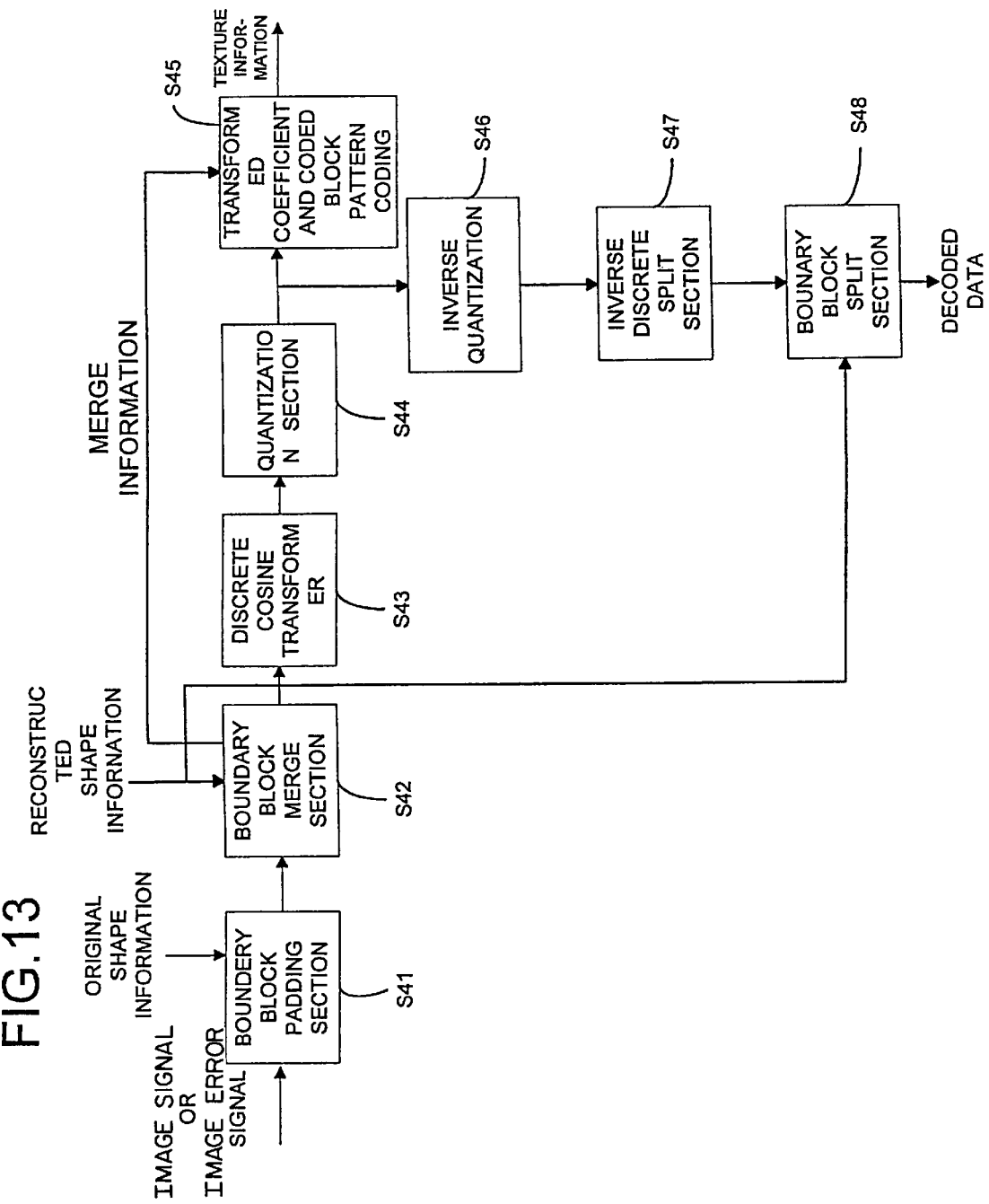
FIG. 13 is a block diagram of a fourth embodiment of the code of the present invention.

As shown in FIG. 13, the device comprises: a boundary block padding section S41 the output of which is connected to the input of a boundary block merge section S42; a discrete cosine transformer S43 the input of which is connected to the output of the boundary block merge section S42; a quantization section S44 the input of which is connected to the output of the discrete cosine transformer S32 ; an inverse quantization section S46 the input of which is connected to the output of the quantization block; an inverse discrete cosine transformer S47 the input of which is connected to the output of the inverse quantization section S46; and a boundary block split section S48 connected to the output of the inverse discrete cosine transformer S47.

A moving picture or still picture received through a picture input is divided into object and background images having predetermined shape information, and transferred into the boundary block padding section S41. The boundary block padding section S41 performs a boundary block padding for the image signal (or image error signal) and the original shape information. It further sees the region having no object image as the mean value of the region having the object image in the sub blocks constituting the boundary block.

The boundary block merge section S42 codes the image signal received from the boundary block padding section S41 sequentially by unit blocks until the boundary blocks are received. The unit blocks comprise the shape information, while the boundary blocks comprise both object and background images. When boundary blocks are received, the boundary block merge section S42 merges the boundary blocks by a BBM technique. In this process, the boundary blocks are merged by using the reconstructed shape information.

The blocks, merged by the BBM technique and including the shape information for the previous and current images, are the same as obtained in the first embodiment.

The merged boundary block is now converted by the discrete cosine transformer S43 and quantized by the quantization section S44.

The transformed coefficient and coded block pattern coding section S45 performs a VLC for the quantized, transformed coefficient with reference to a variable length coding table and codes the merge information transferred from the boundary block merge section S42, generating texture information.

The variable length coding table used in the VLC has the same construction as described in the second embodiment.

The quantized image signal is inverse-quantized by the inverse quantization section S46 and converted by the inverse discrete cosine transformer S47.

The boundary block split section S48 splits the output signal of the inverse discrete cosine transformer S47 with reference to the reconstructed shape information, generating decoded data, that is, reconstructed image signal.
<Fifth Embodiment>

According to a fifth embodiment of the present invention, a coder to code the moving picture is provided. This is accomplished by having successive image sequences entered, by defining it into unit blocks having predetermined shape information.

Figure 14:
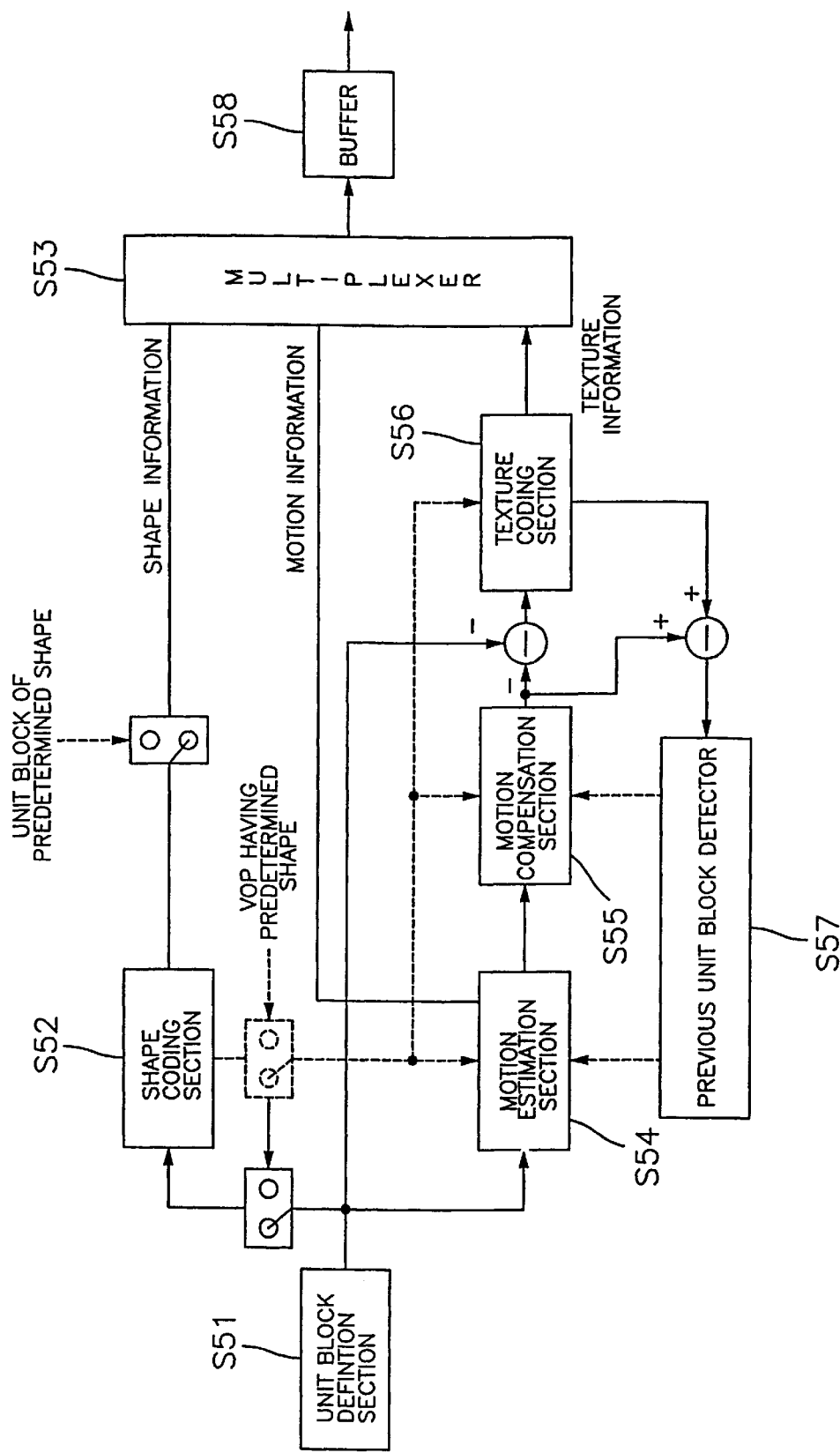
FIG. 14 is a block diagram of a fifth embodiment of the code of the present invention.
Figure 15:
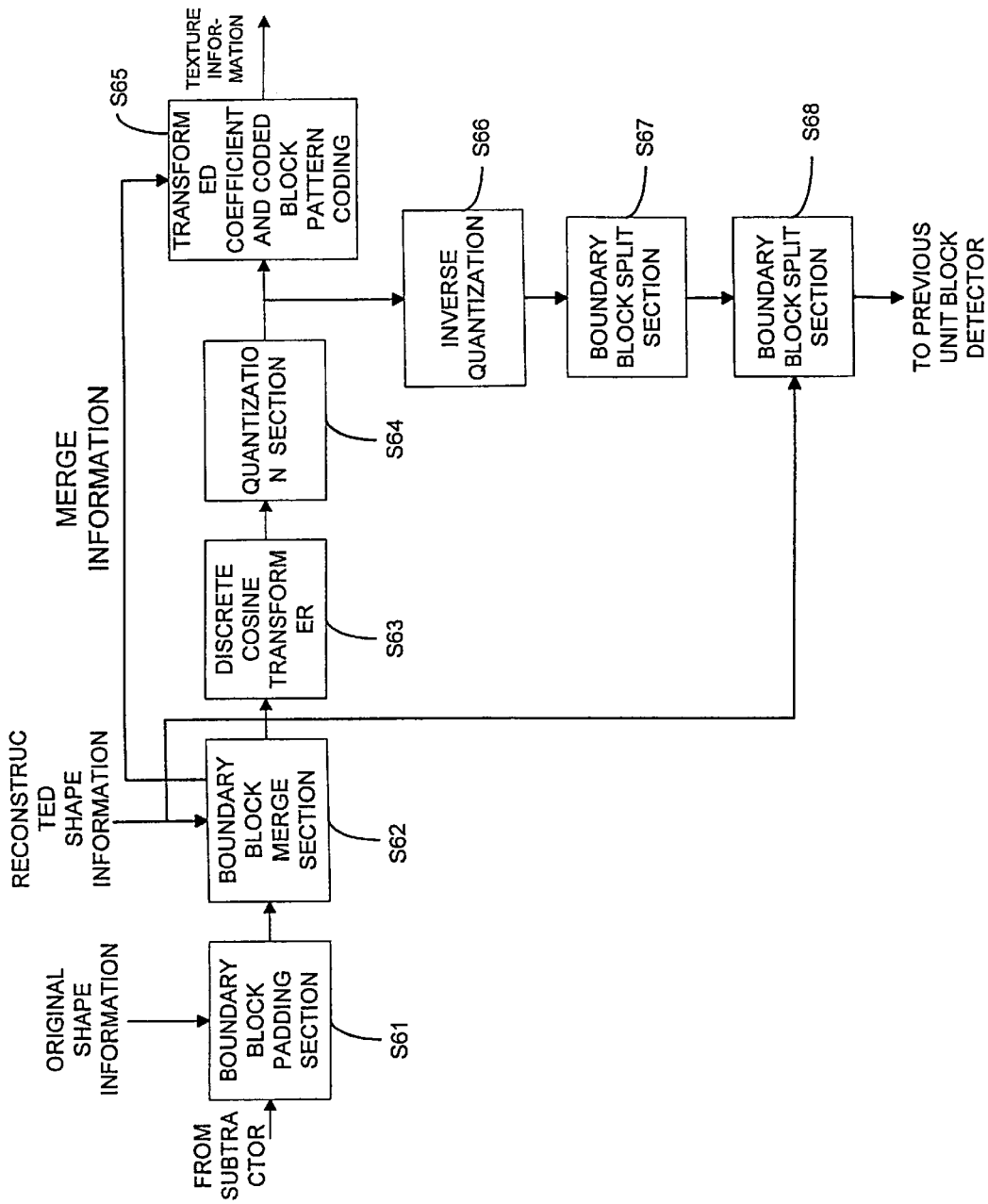
FIG. 15 is a block diagram of the texture coding section in the fifth embodiment of the present invention.

FIGS. 14 and 15 are block diagrams of a device for coding image information according to the fifth preferred embodiment of the present invention.

An unit block definition section S51 defines the moving picture transferred from an image input into unit blocks having predetermined shape information. The concept of the unit block is the same as defined for the VOP of MPEG-4.

The unit blocks are transferred into a motion estimation section S54 so that a motion is estimated in the (16×16) macro block constituting the unit blocks.

The motion information is transferred from the motion estimation section S54 to a motion compensation section S55, and thus motion-compensated information is received by a subtractor.

The subtractor obtains the difference between the unit block motion-compensated by the motion compensation section S55 and the block defined by the unit block definition section S51 and transfers it to a texture coding section S56.

The texture coding section S56 codes the difference from the subtractor and shape information until boundary blocks are received, merges the boundary blocks by using a BBM technique, and variable-length-codes the merged boundary blocks in consideration of the characteristics of the merged boundary blocks.

An adder generates the sum value of the unit blocks motion-compensated by the motion compensation section S55 and the texture coded by the texture coding section S56 and transmits it to a previous reconstructed unit section detector S57.

The previous reconstructed unit block detector S57 detects the unit blocks of the previous picture from the output of the adder, generating it to the motion estimation section S54 and the motion compensation section S55.

A shape coding section S52 codes the shape information of the image received from the unit block definition section S51 in a macro block.

The motion information estimated by the motion estimation section S54, the texture coded by the texture coding section S56, and the shape information coded by the shape coding section S52 are multiplexed by a multiplexer S53 and generated as bit streams by a buffer S58.

The construction of the texture coding section S56 is as described in the first to fourth embodiments. For example, as shown in FIG. 15, the texture coding section S56 as described in the fourth embodiment has the boundary block padding section S61, the input of which is connected to the output of the subtractor and a boundary block split section S68, the input of which is connected to the input of the previous reconstructed unit block detector S57.

Reference numeral S62 indicates a boundary block merge section, S63 a discrete cosine transformer, S64 a quantization section, S65 a transformed coefficient and coded block pattern coding section, S66 an inverse quantization section, S67 an inverse discrete cosine transformer, and S68 a boundary block split section.

<Sixth Embodiment>

According to a sixth embodiment of the present invention, a decoder is provided.

Figure 16:
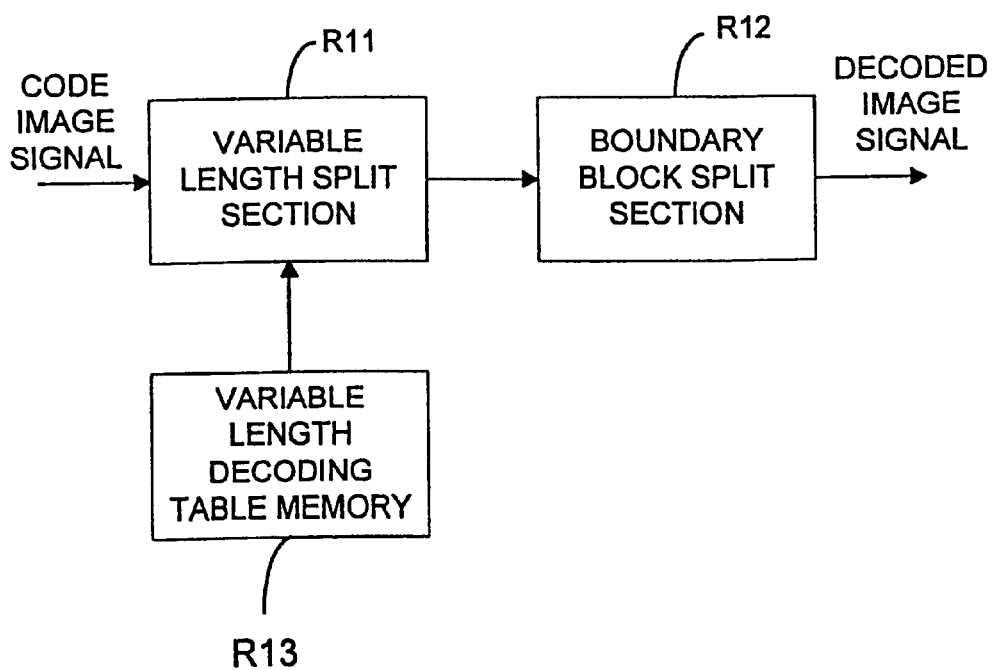
FIG. 16 is a block diagram of a first embodiment of the decoder of the present invention; the present invention.

As shown in FIG. 16, the device comprises a variable length decoding section R11, a boundary block split section R12, and a variable length decoding table memory R13.

The variable length decoding section R11 variable-length-decodes the image signal, merged by a BBM and coded by a VLC, with reference to a variable length decoding table stored in the variable length decoding table R13.

The boundary block split section R12 receives the image signal decoded by the variable length decoding section R11, dividing the boundary blocks or their sub blocks merged by the BBM technique into the boundary blocks or sub blocks before the BBM.

The boundary block decoding section R12 performs a decoding by using different variable length decoding tables according to the number of object blocks, including an object image, out of a plurality of sub blocks that constitute a boundary block. The variable length decoding tables stored in the variable length decoding table memory R13 are constructed according to the arrangement characteristics of the object blocks, including an object image, out of a plurality of sub blocks that constitute a boundary block.

The arrangement characteristic decreases in the frequency of occurrence with the number of bits allotted.

<Seventh Embodiment>

According to the seventh embodiment of the present invention, a decoder is provided to decode the image signal that is coded by compressively converting the boundary blocks merged by a BBM technique.

The image signal to be decoded is compressively coded by using a DCT.

Figure 17:
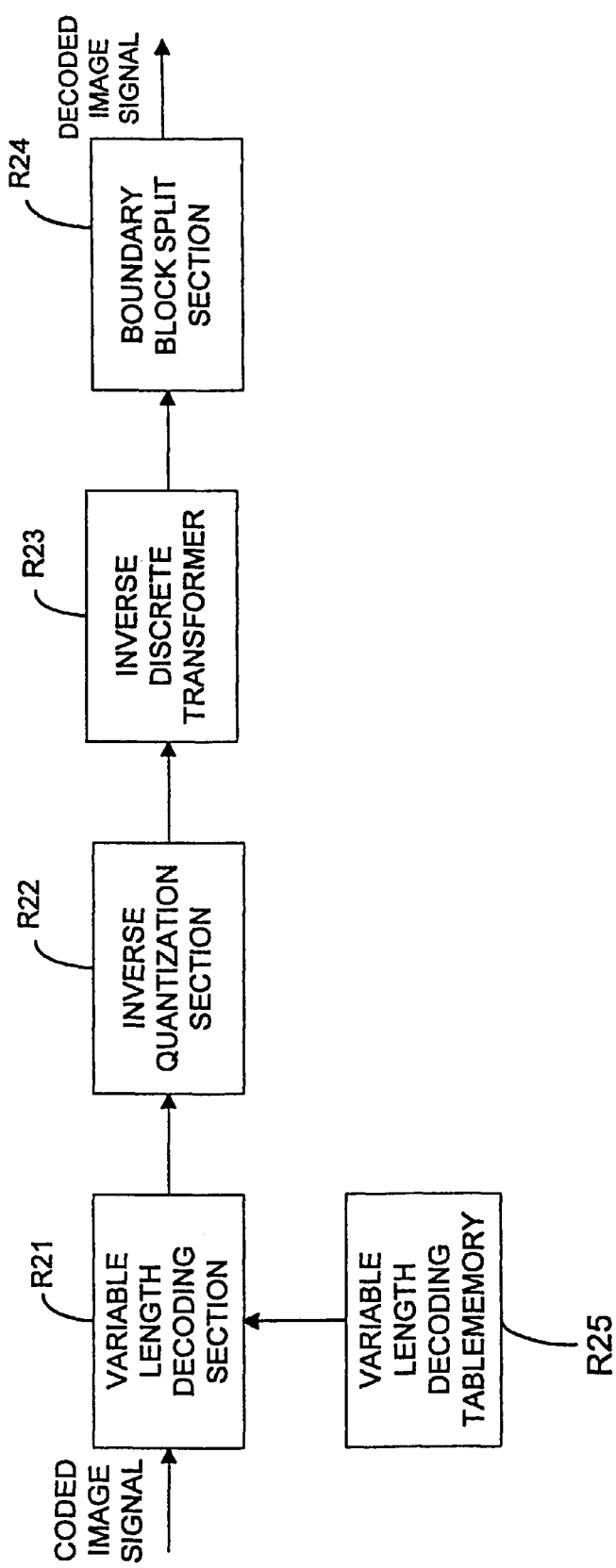
FIG. 17 is a block diagram of a second embodiment of the decoder of the present invention.

As shown in FIG. 17, the device comprises: a variable length decoding section R21; an inverse quantization section R22 connected to the output of the variable length decoding section R21; an inverse discrete cosine transformer R23, the input of which is connected to the output of the inverse quantization section R22; a boundary block split section R24, the input of which is connected to the output of the inverse discrete cosine transformer R23; and a variable length decoding table memory R25 connected to the input of the variable length decoding section R21.

The variable length decoding section R21 variable-length-decodes the image signal, merged by a BBM and coded by a VLC, with reference to a variable length decoding table stored in the variable length decoding table R25.

The inverse quantization block split section R22 inverse-quantizes the image signal, decoded by the variable length decoding section R21.

The inverse-quantized image signal is converted by the inverse discrete cosine transformer R23. The boundary block split section R24 receives the image signal decoded and transferred from the inverse discrete cosine transformer R23, dividing the boundary blocks or their sub blocks merged by the BBM technique into the boundary blocks or sub blocks before the BBM.

The variable length decoding section R21 performs a decoding by using different variable length decoding tables according to the number of object blocks, including an object image, out of a plurality of sub blocks that constitute a boundary block. The variable length decoding tables stored in the variable length decoding table memory R25 are constructed according to the arrangement characteristics of the object blocks, including an object image, out of a plurality of sub blocks that constitute a boundary block.

As shown in FIGS. 21 to 25, the variable length decoding table is variable in construction by differently defining the bits to be used according to the number of object blocks, including an object image, out of a plurality of sub blocks that constitute a boundary block. The construction depends on the arrangement characteristic of the object block and the frequency of its occurrence that are used as variables. The arrangement characteristic decreases in the frequency of occurrence with the number of bits allotted.

FIGS. 21–24 illustrate the variable length decoding tables employed in a luminance block decoding when the number of object blocks are four, three, two, and one, respectively.

The coded signals in the very right column will be decoded into the bit streams on the left column according to the characteristics of the coded blocks (i.e., INTRA block, INTER block, and SPRITE block).

<Eighth Embodiment>

According to an eighth embodiment of the present invention, a decoder is provided to decode the image signal coded with together merge information and transformed coefficients. This is achieved after the boundary blocks merged by a BBM technique are compressively converted.

Figure 18:
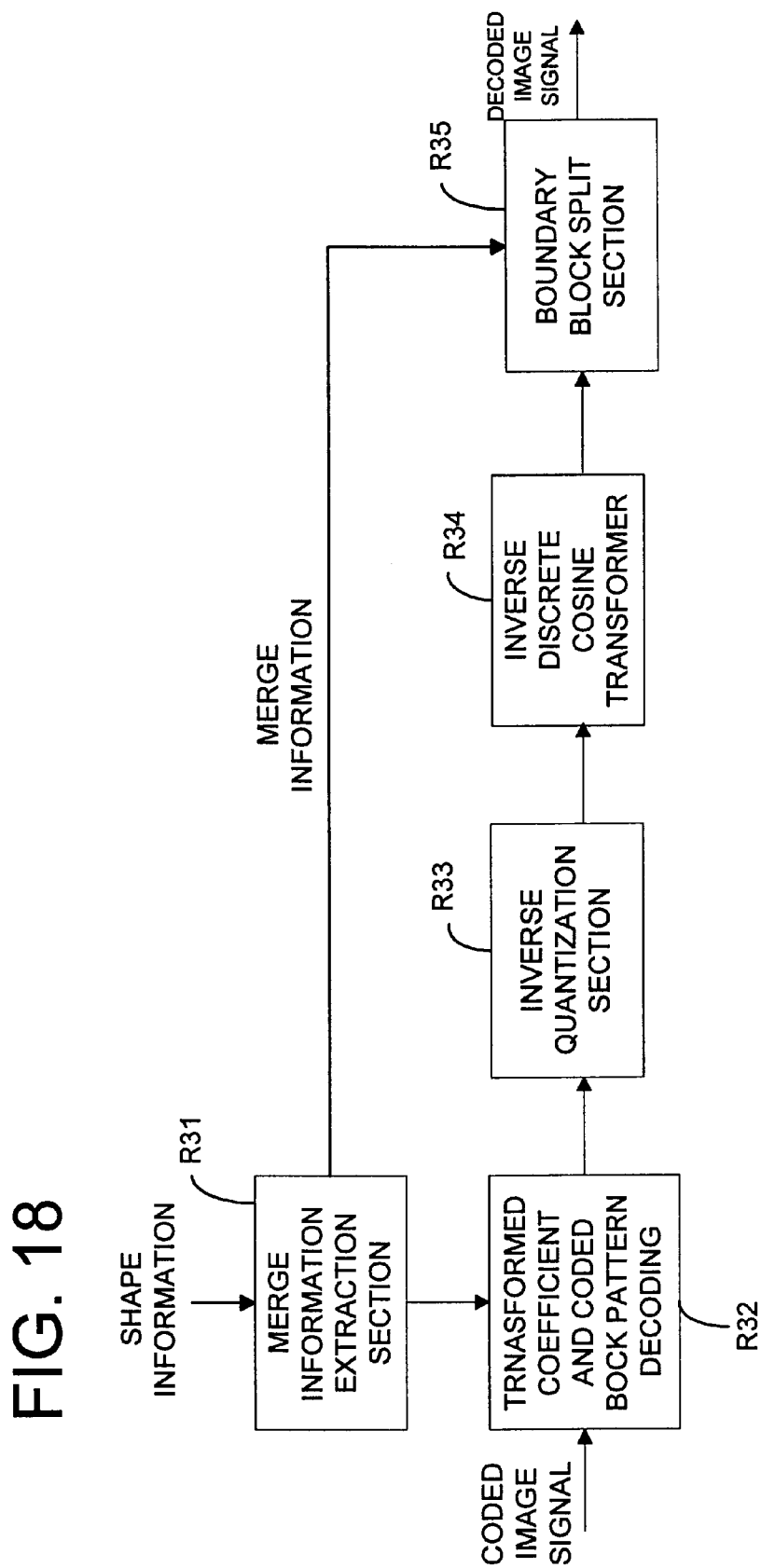
FIG. 18 is a block diagram of a third embodiment of the decoder of the present invention.

As shown in FIG. 18, the device comprises: a merge information extraction section R31; a transformed coefficient and coded block pattern decoding section R32 connected to the output of the merge information extraction section R31; an inverse quantization section R33 connected to the output of the transformed coefficient and coded block pattern decoding section R32; an inverse discrete cosine transformer R34 connected to the output of the inverse quantization section R33; and a boundary block split section R35 connected to the output of the inverse discrete cosine transformer R34.

The merge information extraction section R31 receives the shape information from an encoder to generate merge information concerning the boundary block merge.

The transformed coefficient and coded block pattern decoding section R32 variable-length-decodes the image signal, merged by the BBM technique and coded by a VLC, and the merge information transferred from the merge information extraction section R31.

The inverse quantization section R33 inverse-quantizes the image signal decoded by the transformed coefficient and coded block pattern decoding section R32 and transfers it to the inverse discrete cosine transformer R34, which converts the inverse-quantized signal by inverse discrete cosine transformation.

The boundary block split section R35 receives the decoded image signal transferred from the inverse discrete cosine transformer R34 and the merge information from the merge information extraction section R31, dividing the boundary blocks or their sub blocks merged by the BBM technique into the boundary blocks or sub blocks before the BBM.

The process of a variable-length-decoding performed by the transformed coefficient and coded block pattern decoding section R32 and the variable length decoding tables are the same as described in the seventh embodiment.

<Ninth Embodiment>

According to a ninth embodiment of the present invention, a decoder is provided to decode the moving picture, having successive image sequences entered, by defining it into unit blocks having predetermined shape information.

Figure 19:
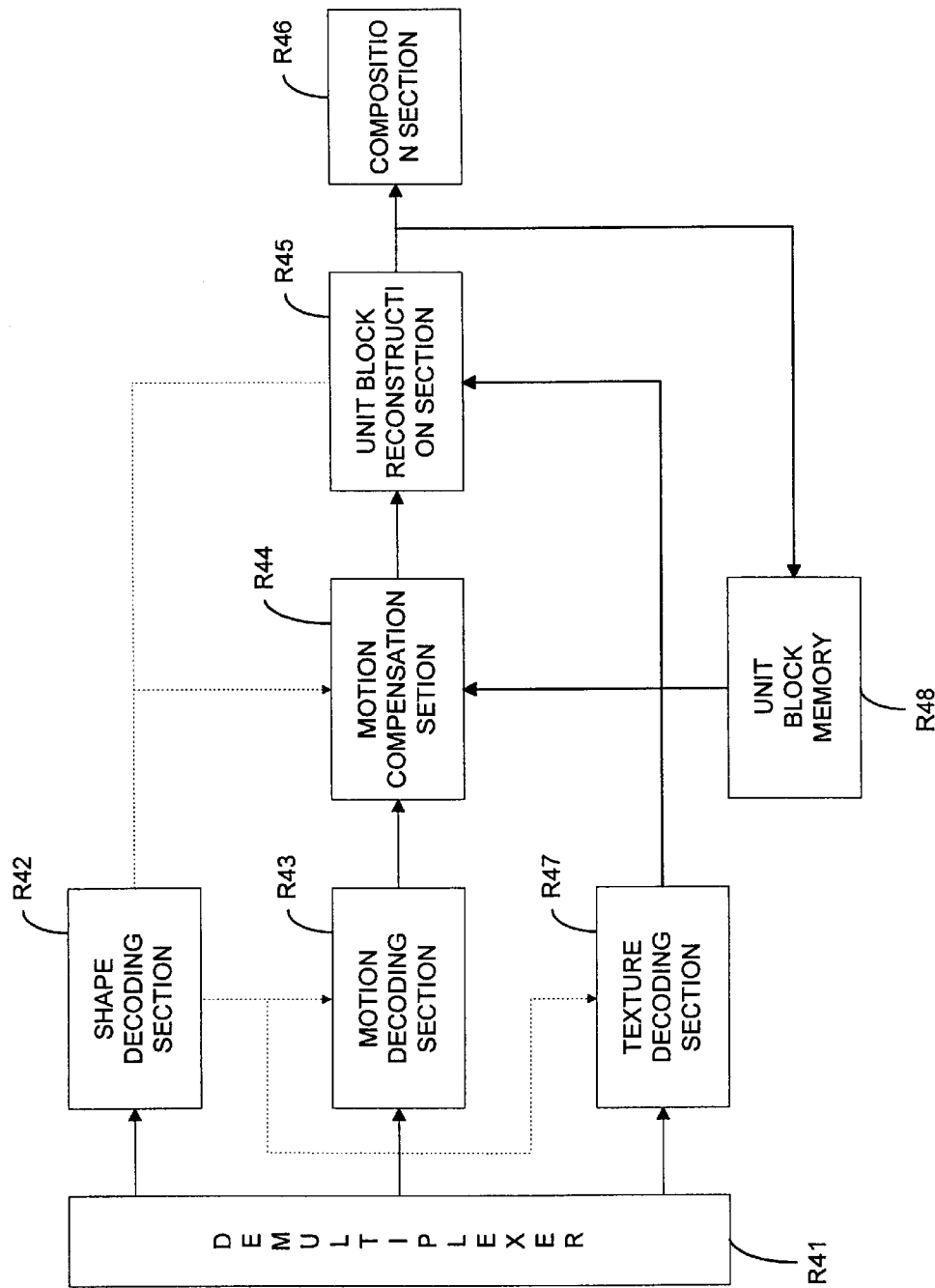
FIG. 19 is a block diagram of a fourth embodiment of the decoder of the present invention.

FIG. 19 is a block diagram of the ninth embodiment of the present invention.

A demultiplexer R41 receives the coded image signal including the image signal processed by a BBM technique, coded by a VLC and multiplexed, demultiplexing it by unit blocks. The concept of the unit block is the same as defined for the VOP of MPEG-4.

The demultiplexed image signal is transferred to a shape decoding section R42, a motion decoding section R43, and a texture decoding section R47.

A unit block memory R48 stores the picture by unit blocks reconstructed by a unit block reconstruction section R45 and transfers it to a motion compensation section R44.

The motion compensation section R44 receives the motion information from the motion decoding section R43, the shape information from the shape decoding section R42, and information concerning the previous unit block from the unit block memory R48, for the purpose of performing a motion compensation.

The unit block reconstruction section R45 receives the shape information from the motion compensation section R44, the shape information from the shape decoding section R42, and information concerning the texture from the texture decoding section R47. It then reconstructs the image in the units of a unit block and transmits it to the unit block memory R48 and a composition section R46.

The composition section R46 composes an image from the unit blocks reconstructed by the unit block reconstruction section R45.

The construction of the texture decoding section S47 is selected from those as described in the sixth to eighth embodiments. For example, as shown in FIG. 18, the texture decoding section S47 as described in the eighth embodiment has the transformed coefficient and coded block pattern decoding section R32 connected to the output of the demultiplexer R41, and the unit block reconstruction section R45 connected to the output of the boundary block split section R35.

<Tenth Embodiment>

According to a tenth embodiment of the present invention, a method of coding image information is provided.

Figure 20:
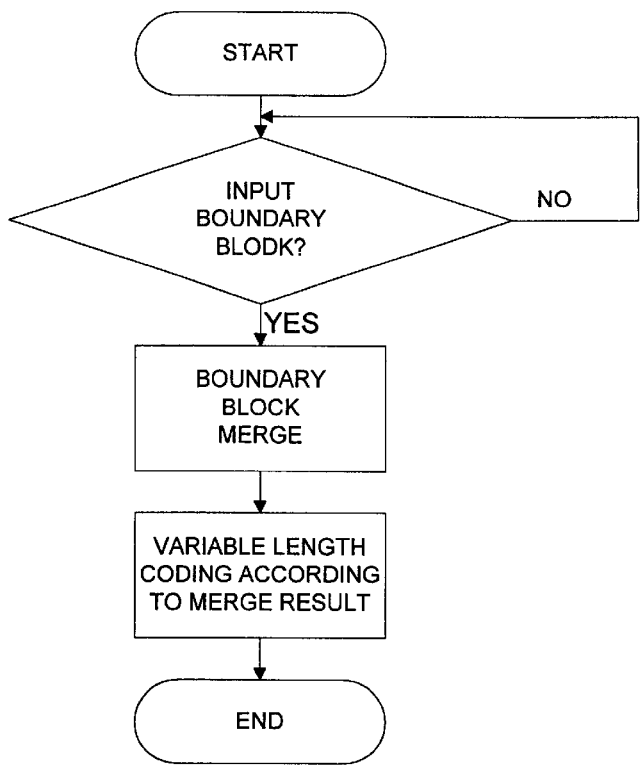
FIG. 20 is a flow diagram illustrating the coding method of the present invention.

As shown in FIG. 20, after the boundary blocks, including object and background images and, out of shape information received are merged by a BBM, the boundary blocks are variable-length-coded by using variable length coding tables according to the result.

The variable length coding tables are varied depending on the arrangement characteristic of the object block, including the object image, out of a plurality of sub blocks constituting the boundary blocks.

From the arrangement characteristic having the least frequency of occurrence, the variable length coding tables are allotted with bits increasing in number with less frequency of occurrence of the arrangement characteristics.

FIGS. 22–25 illustrate the variable length decoding tables according to the tenth embodiment.

<Eleventh Embodiment>

According to a tenth embodiment of the present invention, a method of decoding image information is provided.

Figure 21:
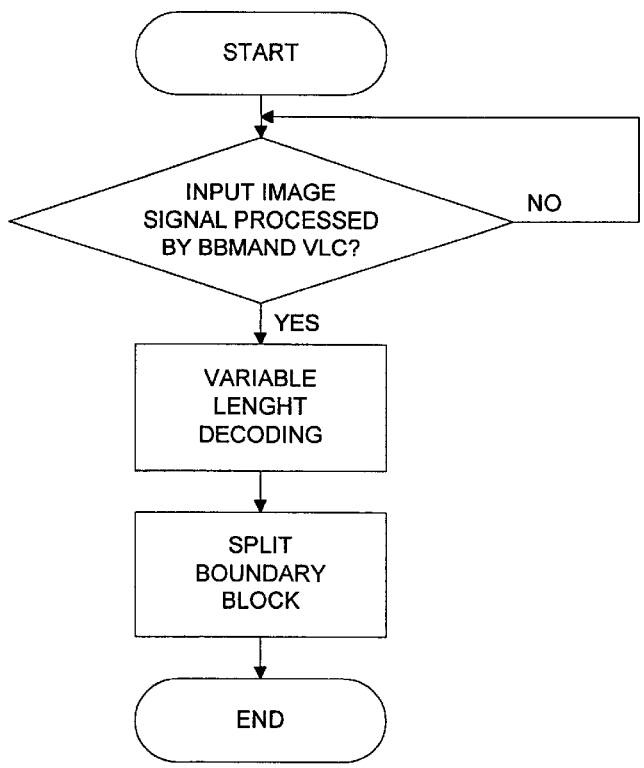
FIG. 21 is a flow diagram illustrating the decoding method of the present invention.

As shown in FIG. 21, after the image signal merged by a BBM and coded by a VLD is variable-length-decoded, the boundary blocks or their sub blocks merged by the BBM technique are divided into the boundary blocks or sub blocks before the BBM.

The variable length decoding table may be constructed in a variety of ways by differently defining the bits to be used according to the number and arrangement characteristics of object blocks, including an object image, out of a plurality of sub blocks that constitute a boundary block. The arrangement characteristic decreases in the frequency of occurrence with the number of bits allotted.

FIGS. 22–25 illustrate the variable length decoding tables employed in a luminance block decoding when these are four, three, two, and one, respectively.

The coded signals in the very right column will be decoded into the bit streams on the left column according to the characteristics of the coded blocks (i.e., INTRA block, INTER block, and SPRITE block).

This embodiment places importance on a coding of boundary blocks for the content-based texture coding, but coded block patterns can also be used in a transparency coding of gray scale shape information, or in a sprite coding.

In case of a transparency coding of gray scale shape information, the types of transparency information and the object block are merged by the BBM technique before a coded block pattern coding of transparency information, so that the compressive coding and transmission efficiencies can be enhanced.

The same effect can be attained in a sprite coding when the number of object blocks is reduced by using the BBM technique prior to a shape coded block pattern coding.

It will be apparent to those skilled in the art that various modifications and variations can be made in a device for and method of coding/decoding image information according to the present invention without departing from the spirit or scope of the invention. Thus, it is intended that the present invention cover the modifications and variations of this invention provided they come within the scope of the appended claims and their equivalents.

What is claimed is:

1. A device for coding image information, which is a shape encoder for splitting an image transferred from an image input unit into an object image and a background image that have predetermined shape information, said predetermined shape information depending upon whether said object image and said background image contains an interior block, an exterior block, or a boundary block:

the device for coding image information, comprising:

a boundary block merge section for merging boundary blocks including both the object and the background images out of shape information received, by using a boundary block merge technique, said boundary block merge section outputting merged boundary blocks;

a variable length coding section for variable-length-coding the merged boundary blocks received from the boundary block merge section; and a variable length coding table memory for storing variable length coding tables which are used when the merged boundary blocks are variable-length-coded by the variable length coding section.

2. The device as defined in claim 1, wherein the boundary block merge section merges a plurality of boundary blocks.

3. The device as defined in claim 1, wherein said boundary blocks comprise a plurality of sub blocks, and wherein the boundary block merge section merges said plurality of sub blocks.

4. The device as defined in claim 1, wherein the boundary block merge section merges luminance blocks.

5. The device as defined in claim 1, wherein the boundary block merge section merges chrominance blocks.

6. The device as defined in claim 1, wherein the boundary block merge block merges luminance and chrominance blocks in separate groups.

7. The device as defined in claim 1, wherein said boundary blocks comprise a plurality of sub blocks, and wherein the variable length coding section codes the boundary blocks by using the variable length coding tables, wherein said variable lengths coding tables are different in the number of coding bits according to the number of object blocks, including the object image, out of a plurality of sub blocks.

8. The device as defined in claim 1, wherein said boundary blocks comprise a plurality of sub blocks, and wherein the variable length coding tables stored in the variable length coding table memory are differently constructed according to arrangement characteristics of object blocks, including the object image, out of said plurality of sub blocks.

9. The device as defined in claim 8, wherein the variable length coding tables have bits that are gradually increased in number with less frequency of occurrence for each arrangement characteristic according to the arrangement characteristics of the object blocks.

10. A method of coding information, which is a shape encoding accomplished by splitting an image transferred from an image input into an object image and a background image that have predetermined shape information, said predetermined shape information depending upon whether said object image and said background image contains an interior block, an exterior block, or a boundary block, the method of coding image information, comprising the steps of:

receiving a plurality of boundary blocks, wherein said boundary blocks comprise object and background images;

merging said boundary blocks, including both the object and background images, out of shape information received, by using a boundary block merge technique; and performing a variable length coding according to the result of said merging step.

11. The method as defined in claim 10, wherein a plurality of boundary blocks are merged in said merging step.

12. The method as defined in claim 10, wherein said boundary blocks comprise a plurality of sub blocks, and wherein said plurality of sub blocks constituting the boundary blocks are merged in said merging step.

13. The method as defined in claim 10, wherein luminance blocks are merged in said merging step.

14. The method as defined in claim 10, wherein chrominance blocks are merged in said merging step.

15. The method as defined in claim 10, wherein luminance and chrominance blocks are each merged in separate groups.

16. The method as defined in claim 10, wherein said step (c) variable-length-codes the boundary blocks by using variable length coding tables, wherein said variable length coding tables are different in the number of coding bits according to the number of object blocks, including the object image, out of a plurality of said sub blocks constituting the boundary blocks.

17. The method as defined in claim 10, wherein said step (c) variable-length-coding codes the boundary blocks by using the variable length coding tables, wherein said variable length coding tables are different in the number of coding bits according to the arranging characteristics of object blocks, including the object image, out of a plurality of said sub blocks constituting the boundary blocks.

18. The method as defined in claim 10, wherein the variable length coding step variable-length-codes the boundary blocks by using the variable length coding tables as follows:

the variable length coding tables have bits that are gradually increased in number with less frequency of occurrence for each arrangement characteristic according to the arrangement characteristics of the object blocks.

* * * * *